(12) United States Patent
Kobayashi

(10) Patent No.: US 9,379,803 B2
(45) Date of Patent: Jun. 28, 2016

(54) ANTENNA SWITCHING DEVICE

(71) Applicant: Panasonic Corporation, Osaka (JP)

(72) Inventor: Masashi Kobayashi, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/401,677

(22) PCT Filed: Mar. 12, 2014

(86) PCT No.: PCT/JP2014/001416
§ 371 (c)(1),
(2) Date: Nov. 17, 2014

(87) PCT Pub. No.: WO2014/148012
PCT Pub. Date: Sep. 25, 2014

(65) Prior Publication Data
US 2015/0162971 A1 Jun. 11, 2015

(30) Foreign Application Priority Data

Mar. 18, 2013 (JP) ................................. 2013-055563

(51) Int. Cl.
| H04B 7/10 | (2006.01) |
| H01Q 3/24 | (2006.01) |
| H01Q 21/24 | (2006.01) |
| H04B 7/02 | (2006.01) |
| H04B 7/12 | (2006.01) |
| H04B 15/02 | (2006.01) |
| H04B 7/06 | (2006.01) |

(52) U.S. Cl.
CPC .. *H04B 7/10* (2013.01); *H01Q 3/24* (2013.01); *H01Q 21/24* (2013.01); *H04B 7/022* (2013.01); *H04B 7/0695* (2013.01); *H04B 7/12* (2013.01); *H04B 15/02* (2013.01)

(58) Field of Classification Search
CPC ......................................................... H04B 7/10
USPC ............................. 455/62, 63.4, 562.1, 575.7
See application file for complete search history.

(56) References Cited

U.S. PATENT DOCUMENTS

| 2007/0035463 A1 | 2/2007 | Hirabayashi |
| 2008/0231420 A1* | 9/2008 | Koyama et al. ............. 340/10.1 |
| 2012/0007785 A1 | 1/2012 | Amari |

FOREIGN PATENT DOCUMENTS

| JP | 08-321799 A | 12/1996 |
| JP | 2004-320583 A | 11/2004 |

(Continued)

OTHER PUBLICATIONS

International Search Report for application No. PCT/JP2014/0014616 dated Jun. 3, 2014.

*Primary Examiner* — Tuan H Nguyen
(74) *Attorney, Agent, or Firm* — Pearne & Gordon LLP

(57) ABSTRACT

An antenna switching apparatus of an embodiment can perform wireless communication with another wireless communication apparatus. The antenna switching apparatus includes: an antenna unit which switches a polarized wave and a beam direction in the wireless communication and which radiates the polarized wave to the other wireless communication apparatus in the beam direction; a communication controller which acquires a communication characteristic corresponding to the polarized wave and the beam direction from the other wireless communication apparatus; an antenna detector which determines an antenna of the other wireless communication apparatus based on the acquired communication characteristic corresponding to the polarized wave and the beam direction; and an antenna switcher which switches the polarized wave and the beam direction in the wireless communication with the other wireless communication apparatus depending on the determined antenna of the other wireless communication apparatus.

7 Claims, 13 Drawing Sheets

(56) References Cited

FOREIGN PATENT DOCUMENTS

| JP | 2006-340235 A | 12/2006 |
| JP | 2011-049864 A | 3/2011 |
| WO | 2011/089676 A1 | 7/2011 |

* cited by examiner

FIG. 5

| PATTERN | POLARIZED WAVE RADIATED BY ANTENNA OF TERMINAL APPARATUS | POLARIZED WAVE RADIATED BY ANTENNA OF OTHER WIRELESS COMMUNICATION APPARATUS | COMMUNICATION CONDITION |
|---|---|---|---|
| 1 | LINEARLY-POLARIZED WAVE (VERTICAL) | LINEARLY-POLARIZED WAVE (VERTICAL) | SATISFACTORY |
| 2 | LINEARLY-POLARIZED WAVE (VERTICAL) | LINEARLY-POLARIZED WAVE (HORIZONTAL) | POOR COMMUNICATION |
| 3 | LINEARLY-POLARIZED WAVE (HORIZONTAL) | LINEARLY-POLARIZED WAVE (VERTICAL) | POOR COMMUNICATION |
| 4 | LINEARLY-POLARIZED WAVE (HORIZONTAL) | LINEARLY-POLARIZED WAVE (HORIZONTAL) | SATISFACTORY |
| 5 | LINEARLY-POLARIZED WAVE (VERTICAL/HORIZONTAL) | CIRCULARLY-POLARIZED WAVE (RIGHT-HANDED) | SATISFACTORY ALTHOUGH RECEPTION POWER IS HALVED |
| 6 | LINEARLY-POLARIZED WAVE (VERTICAL/HORIZONTAL) | CIRCULARLY-POLARIZED WAVE (LEFT-HANDED) | SATISFACTORY ALTHOUGH RECEPTION POWER IS HALVED |
| 7 | CIRCULARLY-POLARIZED WAVE (RIGHT-HANDED) | LINEARLY-POLARIZED WAVE (VERTICAL/HORIZONTAL) | SATISFACTORY ALTHOUGH RECEPTION POWER IS HALVED |
| 8 | CIRCULARLY-POLARIZED WAVE (LEFT-HANDED) | LINEARLY-POLARIZED WAVE (VERTICAL/HORIZONTAL) | SATISFACTORY ALTHOUGH RECEPTION POWER IS HALVED |
| 9 | CIRCULARLY-POLARIZED WAVE (RIGHT-HANDED) | CIRCULARLY-POLARIZED WAVE (RIGHT-HANDED) | SATISFACTORY |
| 10 | CIRCULARLY-POLARIZED WAVE (RIGHT-HANDED) | CIRCULARLY-POLARIZED WAVE (LEFT-HANDED) | POOR COMMUNICATION |
| 11 | CIRCULARLY-POLARIZED WAVE (LEFT-HANDED) | CIRCULARLY-POLARIZED WAVE (RIGHT-HANDED) | POOR COMMUNICATION |
| 12 | CIRCULARLY-POLARIZED WAVE (LEFT-HANDED) | CIRCULARLY-POLARIZED WAVE (LEFT-HANDED) | SATISFACTORY |

FIG. 10(A)

DURING COMMUNICATION
(BEFORE PREDETERMINED TIME)

| BEAM | 1 | 2 | 3 | ... | 15 | 16 |
|---|---|---|---|---|---|---|
| RIGHT-HANDED | ◎ | ○ | × | ... | △ | × |
| LEFT-HANDED | × | × | × | ... | ○ | △ |

DURING COMMUNICATION
(AT PRESENT)

| BEAM | 1 | 2 | 3 | ... | 15 | 16 |
|---|---|---|---|---|---|---|
| RIGHT-HANDED | × | × | × | ... | ◎ | △ |
| LEFT-HANDED | | | | | | |

FIG. 10(B)

BEFORE INTERRUPTION

| BEAM | 1 | 2 | 3 | ... | 15 | 16 |
|---|---|---|---|---|---|---|
| RIGHT-HANDED | ◎ | ○ | × | ... | △ | × |
| LEFT-HANDED | × | × | × | ... | ○ | △ |

AFTER INTERRUPTION

| BEAM | 1 | 2 | 3 | ... | 15 | 16 |
|---|---|---|---|---|---|---|
| RIGHT-HANDED | × | × | × | ... | × | × |
| LEFT-HANDED | × | × | × | ... | ○ | △ |

FIG. 11

| | ANTENNA OF TERMINAL APPARATUS | ANTENNA OF OTHER WIRELESS COMMUNICATION APPARATUS | CAUSE OF COMMUNICATION INTERRUPTION | NUMBER OF TIMES OF BEAM DIRECTION SCANNING |
|---|---|---|---|---|
| CONVENTIONAL | CIRCULARLY-POLARIZED WAVE | LINEARLY-POLARIZED WAVE | MOVEMENT OF TERMINAL APPARATUS | 32 |
| | | | OBSTACLE INTERVENTION | 32 |
| | | CIRCULARLY-POLARIZED WAVE | MOVEMENT OF TERMINAL APPARATUS | 32 |
| | | | OBSTACLE INTERVENTION | 32 |
| EMBODIMENT | CIRCULARLY-POLARIZED WAVE | LINEARLY-POLARIZED WAVE | MOVEMENT OF TERMINAL APPARATUS | 16 |
| | | | OBSTACLE INTERVENTION | 16 |
| | | CIRCULARLY-POLARIZED WAVE | MOVEMENT OF TERMINAL APPARATUS | 16 |
| | | | OBSTACLE INTERVENTION | 32 |

FIG. 15

| TERMINAL APPARATUS / OTHER WIRELESS COMMUNICATION APPARATUS | | LINEARLY-POLARIZED WAVE (503) | CIRCULARLY-POLARIZED WAVE (504) |
|---|---|---|---|
| LINEARLY-POLARIZED WAVE | HORIZONTALLY-POLARIZED WAVE | 2 | 2 |
| | VERTICALLY-POLARIZED WAVE | RECEPTION IMPOSSIBLE | 2 |

FIG. 16

| | ANTENNA OF TERMINAL APPARATUS | ANTENNA OF OTHER WIRELESS COMMUNICATION APPARATUS | CAUSE OF COMMUNICATION INTERRUPTION | NUMBER OF TIMES OF BEAM DIRECTION SCANNING |
|---|---|---|---|---|
| CONVENTIONAL | CIRCULARLY-POLARIZED WAVE | LINEARLY-POLARIZED WAVE | MOVEMENT OF TERMINAL APPARATUS | 32 |
| | | | OBSTACLE INTERVENTION | 32 |
| | | CIRCULARLY-POLARIZED WAVE | MOVEMENT OF TERMINAL APPARATUS | 32 |
| | | | OBSTACLE INTERVENTION | 32 |
| EMBODIMENT | CIRCULARLY-POLARIZED WAVE | LINEARLY-POLARIZED WAVE | MOVEMENT OF TERMINAL APPARATUS | 16 |
| | | | OBSTACLE INTERVENTION | 16 |
| | LINEARLY-POLARIZED WAVE | CIRCULARLY-POLARIZED WAVE | MOVEMENT OF TERMINAL APPARATUS | 16 |
| | | | OBSTACLE INTERVENTION | 16 |

ANTENNA SWITCHING DEVICE

TECHNICAL FIELD

The present disclosure relates to an antenna switching apparatus for switching the radiation characteristics of electromagnetic waves in wireless communication.

BACKGROUND ART

Conventionally, as digital apparatus become highly functional and communication terminals capable of using a wireless LAN (Local Area Network) become widely available, a technology for transmitting large-volume data (for example, HD (High Density) video data) by making communication terminals communicate with each other without interposing an access point, for example, is attracting attention.

However, in the case that large-volume data is transmitted using a wireless LAN, a transmitter compresses transmission data and a receiver decompresses received data, whereby a slight delay occurs. Hence, in an application required to operate in real time, the video transmission according to the conventional technology in which data is compressed and decompressed each time large-volume data is transmitted has not been efficient.

Hence, at present, high-speed wireless communication capable of transmitting uncompressed and non-delay video data using a millimeter wave (for example, 60 [GHz]) is receiving attention.

Millimeter wave communication uses a band wider than that of the wireless LAN communication. High-speed wireless communication, for example, using a wave of 1 [GHz] or more becomes possible by effectively using the allowable range of millimeter wave communication. However, since the electromagnetic wave of the 60 GHz millimeter wave band is long in wavelength and high in rectilinearity and is apt to be absorbed by oxygen molecules in the atmosphere, it is pointed out that the 60 GHz millimeter wave is unsuited for long distance transmission.

On the other hand, the distance of communication can be extended by using beam forming in which the direction of the beam is changed electronically by arranging a plurality of antenna elements and by controlling the phases of the transmission wave and the received wave at each antenna element. However, when an obstacle (for example, a human hand) intervenes between the communication terminals during wireless communication, the communication may be interrupted.

A wireless communication apparatus is known in which, for example, in the case that the communication characteristic of line-of-sight communication, that is, communication using a direct wave, was degraded by an obstacle, communication interruption is avoided by changing the rotation direction of the circularly-polarized wave being used for wireless communication (for example, refer to Patent Document 1).

RELATED ART DOCUMENTS

Patent Documents

Patent Document 1: JP-A-H08-321799

SUMMARY OF THE INVENTION

Problem to be Solved by the Invention

The inventors of the present disclosure have examined antenna switching apparatuses in which wave radiation characteristics in wireless communication are switched. However, a case in which the communication characteristic between a wireless communication apparatus and a communication apparatus serving as a communication partner changes is not assumed in the above-mentioned Patent Document 1.

Hence, in the case that the communication characteristic has changed, the characteristic of the antenna in wireless communication changes, and there occurs a problem that it is difficult to continue a satisfactory communication characteristic in the wireless communication between the wireless communication apparatus and the communication apparatus serving as a communication partner.

To solve the above-mentioned problem in the conventional technology, the present disclosure is intended to provide an antenna switching apparatus that acquires the communication characteristic between the apparatus and the other wireless communication apparatus serving as a communication partner and easily switches the polarized wave to be radiated by an antenna to the polarized wave corresponding to the satisfactory communication characteristic therebetween, periodically or in the case of communication interruption.

Means for Solving the Problem

The present disclosure provides an antenna switching apparatus performing wireless communication with another wireless communication apparatus, including: an antenna unit which switches a polarized wave and a beam direction in the wireless communication and which radiates the polarized wave to the other wireless communication apparatus in the beam direction; a communication controller which acquires a communication characteristic corresponding to the polarized wave and the beam direction from the other wireless communication apparatus; an antenna detector which determines an antenna of the other wireless communication apparatus based on the acquired communication characteristic corresponding to the polarized wave and the beam direction; and an antenna switcher which switches the polarized wave and the beam direction in the wireless communication with the other wireless communication apparatus depending on the determined antenna of the other wireless communication apparatus.

Advantages of the Invention

According to the present disclosure, the communication characteristic between the apparatus and the other wireless communication apparatus serving as a communication partner is acquired periodically or in the case of communication interruption, and it is possible to easily switch the polarized wave to be radiated by an antenna to the polarized wave corresponding to the satisfactory communication characteristic therebetween.

BRIEF DESCRIPTION OF THE DRAWINGS

FIGS. 2(A) and 2(B) are views showing a circuit configuration of an antenna unit, in which FIG. 2(A) is a view showing a circuit configuration of the antenna unit in the case of transmitting the packet transmission signal output from a transmitter, and FIG. 2(B) is a view showing a circuit configuration of the antenna unit in the case of outputting a packet receiving signal to a receiver.

FIGS. 4(A)-4(C) are views showing communication paths formed between the terminal apparatus and the other wireless communication apparatus, in which FIG. 4(A) shows a case in which the communication characteristic at the communication path between the terminal apparatus and the other wireless communication apparatus is not changed, FIG. 4(B) shows communication paths between the terminal apparatus and the other wireless communication apparatus in the case that the terminal apparatus was moved to the upper position shown in FIG. 4(B), and FIG. 4(C) shows communication paths between the terminal apparatus and the other wireless communication apparatus in the case that an obstacle intervened therebetween.

FIG. 5 is a table showing the relationship among the polarized wave radiated by the antenna of the terminal apparatus, the polarized wave radiated by the antenna of the other wireless communication apparatus and the communication characteristic therebetween.

FIG. 10(A) is a table briefly showing an example of the result of the communication characteristic acquired periodically during communication in each beam direction in the case that the other wireless communication apparatus has a circularly-polarized wave antenna, and FIG. 10(B) is a table briefly showing an example of the result of the communication characteristic after communication interruption in each beam direction in the case that the other wireless communication apparatus has a circularly-polarized wave antenna.

FIG. 11 is a comparison table in which the conventional technology and the first embodiment are compared with respect to the number of times in which beam direction scanning is performed to acquire the communication characteristic after communication interruption.

FIG. 15 is a table showing the result of the comparison with respect to the polarized wave radiated by the antenna of the other wireless communication apparatus in the case that the terminal apparatus used a linearly-polarized wave.

FIG. 16 is a comparison table in which the conventional technology and the second embodiment are compared with respect to the number of times in which beam direction scanning is performed to acquire the communication characteristic after communication interruption.

MODE FOR CARRYING OUT THE INVENTION

Figure 1:
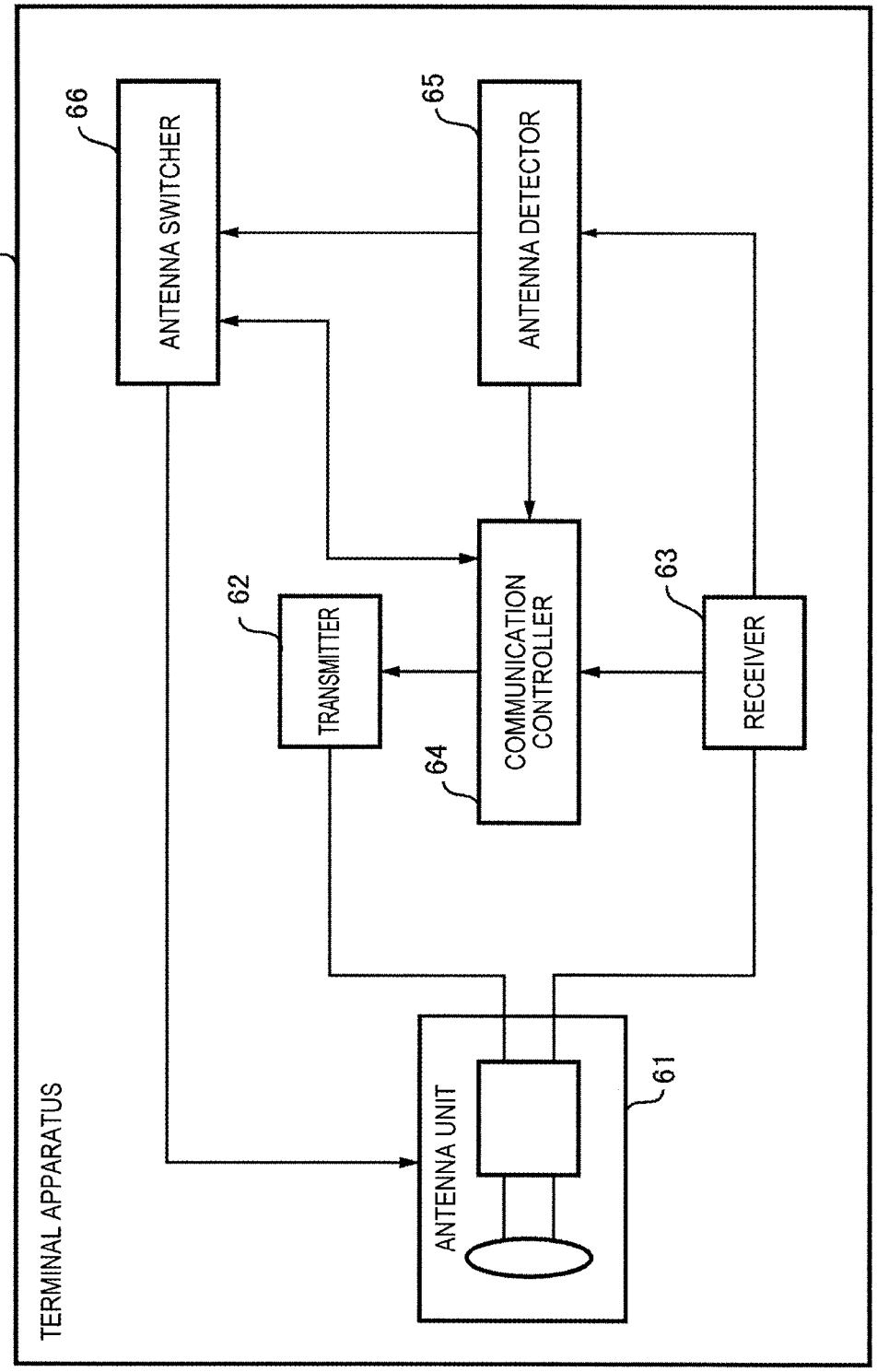
FIG. 1 is a block diagram showing an internal configuration of a terminal apparatus according to each embodiment.

Circumstances Leading to the Contents of Each Embodiment

Before the description of an antenna switching apparatus according to each embodiment of the present disclosure, first, as circumstances leading to the contents of each embodiment, the above-mentioned Patent Document 1 and problems in Patent Document 1 will be described.

According to Patent Document 1, a communication apparatus on the side of a basic switch (hereafter referred to as "first communication apparatus") communicates with a communication apparatus on the side of a network terminal (hereafter referred to as "second communication apparatus") using a wireless LAN.

The first communication apparatus has a plurality of antenna apparatus capable of receiving an electromagnetic wave having the same rotation direction as that used at the time of transmission. The second communication apparatus has a first antenna apparatus capable of transmitting and receiving a circularly-polarized wave having the same rotation direction as that of each antenna apparatus of the first communication apparatus and a second antenna apparatus capable of transmitting and receiving a circularly-polarized wave having a rotation direction different from that of the first communication apparatus. In other words, the second communication apparatus has an antenna apparatus in which the adjustment of two kinds of directivity of a circularly-polarized wave is possible.

As a result, the communication path to be formed between the first communication apparatus and the second communication apparatus is classified into two kinds: a communication path in which the direct wave of a circularly-polarized wave or the reflected wave obtained after the circularly-polarized wave was reflected multiple times is transmitted using the first communication apparatus and a communication path in which the reflected wave obtained after a circularly-polarized wave was reflected odd-numbered times is transmitted using the second communication apparatus. Hence, even in the case that communication using the direct wave became difficult between the first communication apparatus and the second communication apparatus or even in the case that an obstacle intervened in the communication path between the first communication apparatus and the second communication apparatus, communication can be performed while suppressing the influence of multipath by performing switching to the reflected wave obtained after the circularly-polarized wave was reflected odd-numbered times.

However, it is assumed in Patent Document 1 that a case in which the communication characteristic between the first communication apparatus and the second communication apparatus has changed is not considered. For example, in the case that the first communication apparatus and the second communication apparatus perform wireless communication using a high-frequency signal in the millimeter wave band, when the second communication apparatus is moved or an obstacle (for example, a human hand) intervenes between the first communication apparatus and the second communication apparatus, the wireless communication between the first communication apparatus and the second communication apparatus is apt to be interrupted.

When the wireless communication between the first communication apparatus and the second communication apparatus is interrupted actually, it is necessary to acquire the communication characteristic between the first communication apparatus and the second communication apparatus before starting the wireless communication. More specifically, the first communication apparatus and the second communication apparatus acquire the communication characteristic between the communication partners by performing trial communication multiple times, and the electromagnetic wave (polarized wave) radiated by the antenna is switched to a polarized wave (for example, a circularly-polarized wave or a linearly-polarized wave) corresponding to the satisfactory communication characteristic therebetween.

For this reason, when the wireless communication between the first communication apparatus and the second communication apparatus is interrupted, the number of times in which trial communication is performed increases, thereby causing a problem that the power consumption in the first communication apparatus and the second communication apparatus increases.

Hence, an example of an antenna switching apparatus that acquires the communication characteristic between the apparatus and the other wireless communication apparatus serving as a communication partner and easily switches the polarized wave to be radiated by an antenna to the polarized wave corresponding to the satisfactory communication characteristic therebetween, periodically or in the case of communication interruption, is described in each of the following embodiments.

Next, the antenna switching apparatus according to each embodiment of the present disclosure will be described referring to the drawings. An example of the antenna switching apparatus according to the present disclosure is described as a terminal apparatus that performs wireless communication with the other wireless communication apparatus serving as a communication partner, and, for ease of description, the other wireless communication apparatus is assumed to be a stationary apparatus (for example, a TV apparatus) that is not movable. The terminal apparatus according to each embodiment performs wireless communication using an electromagnetic wave (polarized wave) of a millimeter wave band, for example, 60 [GHz].

First Embodiment

In a first embodiment, a terminal apparatus 60 radiates a left-handed circularly-polarized wave or a right-handed circularly-polarized wave, for example, in the 60 GHz millimeter wave band, while switching the waves, thereby transmitting a millimeter-wave packet transmission signal to another wireless communication apparatus 50 serving as a communication partner.

FIG. 1 is a block diagram showing an internal configuration of the terminal apparatus 60 according to each embodiment. The terminal apparatus 60 shown in FIG. 1 includes an antenna unit 61, a transmitter 62, a receiver 63, a communication controller 64, an antenna detector 65, and an antenna switcher 66.

In wireless communication with the other wireless communication apparatus 50, the antenna unit 61 switches the rotation direction (left-handed direction or right-handed direction) and the beam direction of the circularly-polarized wave according to the antenna switching control signal generated by the antenna switcher 66, transmits a packet transmission signal using the left-handed or right-handed circularly-polarized wave, and receives a packet receiving signal transmitted using the left-handed or right-handed circularly-polarized wave.

In response to the communication characteristic acquisition request generated by the communication controller 64, the transmitter 62 generates a packet transmission signal for requesting, for example, the communication characteristic (for example, S/N: Signal to Noise ratio, the same applies hereafter) between the terminal apparatus and the other wireless communication apparatus 50, and outputs the signal to the antenna unit 61.

The packet receiving signal returned by the other wireless communication apparatus 50 is input to the receiver 63 through the antenna unit 61, and the receiver 63 demodulates the packet receiving signal and outputs the result of the demodulation of the packet receiving signal to the communication controller 64 or the antenna detector 65.

In the case that the terminal apparatus 60 performs wireless communication with the other wireless communication apparatus 50, the communication controller 64 generates the communication characteristic acquisition request for requesting, for example, the communication characteristic (for example, S/N) between the terminal apparatus and the other wireless communication apparatus 50, and outputs the request to the transmitter 62.

The communication controller 64 instructs the switching of the rotation direction and the beam direction of the circularly-polarized wave to the antenna switcher 66 and acquires the communication characteristic between the terminal apparatus and the other wireless communication apparatus 50 on the basis of the result of the demodulation of the packet receiving signal at the receiver 63. The communication controller 64 stores the result of the demodulation of the packet receiving signal demodulated by the receiver 63 in memory (not shown).

The antenna detector 65 stores the result of the demodulation of the packet receiving signal demodulated by the receiver 63 in memory (not shown), and determines whether the shape of the antenna of the other wireless communication apparatus 50 is a circularly-polarized wave antenna or a linearly-polarized wave antenna on the basis of the result of the demodulation of the packet receiving signal, that is, the communication characteristic between the terminal apparatus and the other wireless communication apparatus 50. In other words, the antenna detector 65 determines whether the type of the polarized wave radiated by the antenna of the other wireless communication apparatus 50 is a circularly-polarized wave or a linearly-polarized wave.

After the antenna detector 65 has determined that the shape of the antenna of the other wireless communication apparatus 50 is a circularly-polarized wave antenna, the antenna detector 65 determines whether the rotation direction of the polarization plane of the circularly-polarized wave radiated by the circularly-polarized wave antenna is the left-handed direction or the right-handed direction. The antenna detector 65 outputs the result of the determination of the rotation direction of the polarization plane of the circularly-polarized wave to the communication controller 64 or the antenna switcher 66.

According to the instruction of the communication controller 64 or the result of the determination of the type of the polarized wave at the antenna detector 65, the antenna switcher 66 generates the antenna switching control signal for switching the rotation direction and the beam direction of the polarization plane of the circularly-polarized wave and outputs the signal to the antenna unit 61. In other words, the antenna switcher 66 causes the antenna unit 61 to switch the rotation direction of the polarization plane of the circularly-polarized wave and to switch the beam direction indicating the direction of the main beam of the circularly-polarized wave.

Figure 2A:
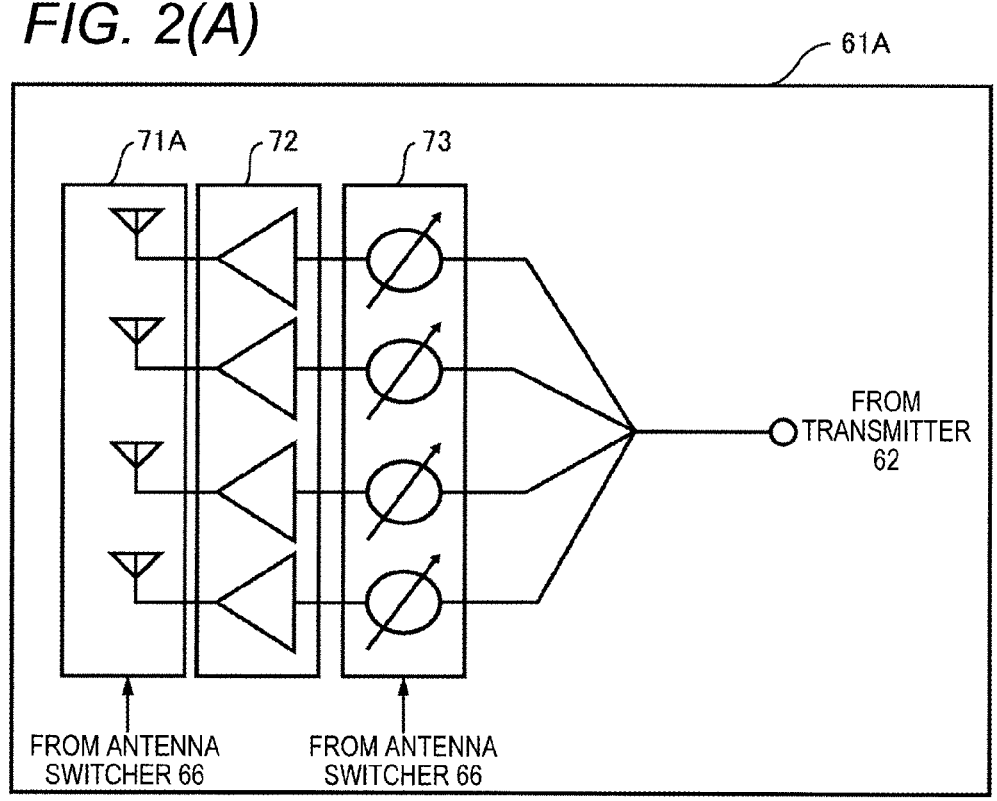
Figure 2B:
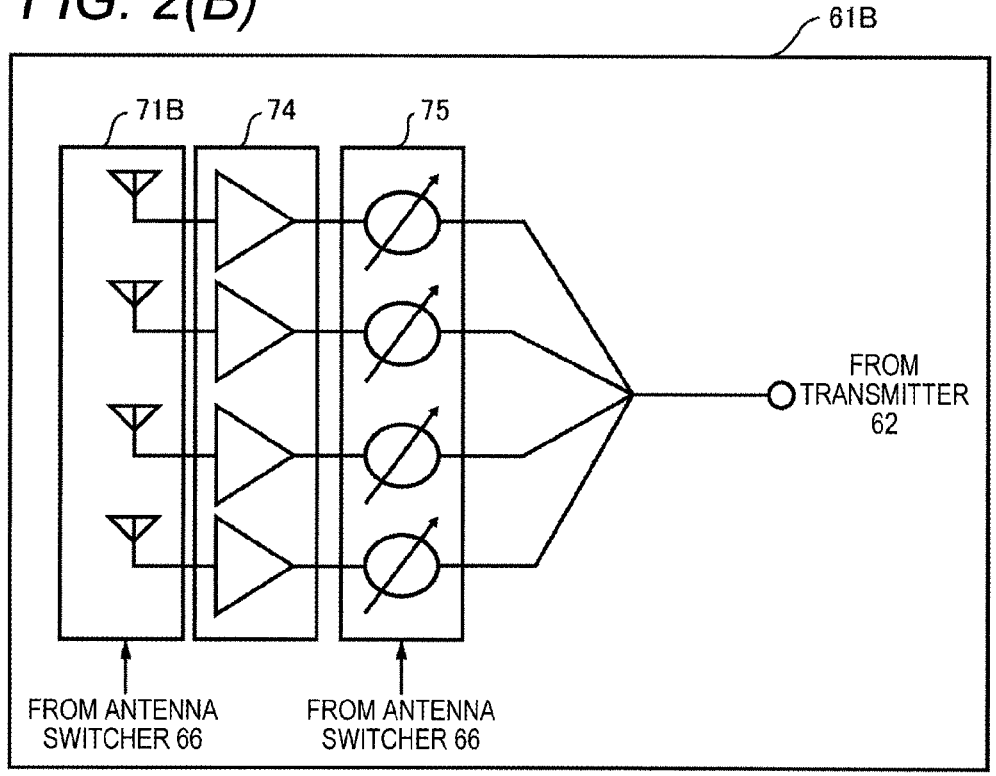

FIG. 2 is a view showing a circuit configuration of the antenna unit 61. FIG. 2(A) is a view showing a circuit configuration of an antenna unit 61A in the case of transmitting the packet transmission signal output from the transmitter 62. FIG. 2(B) is a view showing a circuit configuration of an antenna unit 61B in the case of outputting the packet receiving signal to the receiver 63.

The antenna unit 61A shown in FIG. 2(A) includes a plurality of circularly-polarized wave antennas 71A, a plurality of amplifiers 72 and a plurality of variable phase shifters 73. The packet transmission signal generated by the transmitter 62 is distributed and input to the respective variable phase shifters 73. However, the antenna unit 61A may have a configuration other than that shown in FIG. 2(A), and may be configured by using components other than the plurality of circularly-polarized wave antennas 71A, the plurality of amplifiers 72 and the plurality of variable phase shifters 73. Furthermore, although the direction of the main beam is switched at the antenna unit 61A, a configuration may also be used in which the direction of the main beam is switched by performing phase shifting at a frequency convertor or in the base band, instead of the RF (wireless frequency band) and making connection to the circularly-polarized wave antennas 71A.

The antenna unit 61B shown in FIG. 2(B) includes a plurality of circularly-polarized wave antennas 71B, a plurality of amplifiers 74 and a plurality of variable phase shifters 75. The packet receiving signals output from the respective variable phase shifters 75 are synthesized and input to the receiver 63. However, the antenna unit 61B may have a configuration other than that shown in FIG. 2(B), and may be configured by using components other than the plurality of circularly-polarized wave antennas 71B, the plurality of amplifiers 74 and the plurality of variable phase shifters 75. Furthermore, although the direction of the main beam is switched at the antenna unit 61A, a configuration may also be used in which the direction of the main beam is switched by performing phase shifting at a frequency convertor or in the base band, instead of the RF (wireless frequency band) and making connection to the circularly-polarized wave antennas 71B.

The antenna unit 61A shown in FIG. 2(A) is provided with the circularly-polarized wave antennas 71A, for example, four elements, and is also provided with the amplifiers 72 and the variable phase shifters 73 as many as the circularly-polarized wave antennas 71A. Similarly, the antenna unit 61B shown in FIG. 2(B) is provided with the circularly-polarized wave antennas 71B, for example, four elements, and is also provided with the amplifiers 74 and the variable phase shifters 75 as many as the circularly-polarized wave antennas 71B.

According to the antenna switching control signal generated by the antenna switcher 66, each variable phase shifter 73 gives a different phase amount to each packet transmission signal output from the transmitter 62 and outputs the signal to each amplifier 72. Hence, the antenna unit 61A can switch the direction of the transmission beam for transmitting the packet transmission signal to be radiated from each circularly-polarized wave antenna 71.

Each amplifier 72 amplifies the packet transmission signal to which the different phase amount was given by each variable phase shifter 73 and outputs the signal to each circularly-polarized wave antenna 71A.

The circularly-polarized wave antenna 71A supplies the power of the packet transmission signal amplified by each amplifier 72 and radiates a left-handed or right-handed circularly-polarized wave according to the antenna switching control signal generated by the antenna switcher 66, thereby transmitting the packet transmission signal.

The circularly-polarized wave antennas 71B receives the packet receiving signal transmitted as the left-handed or right-handed circularly-polarized wave according to the antenna switching control signal generated by the antenna switcher 66, and outputs the signal to each amplifier 74.

Each amplifier 74 amplifies the packet receiving signal received by each circularly-polarized wave antennas 71B and outputs the signal to each variable phase shifter 75.

According to the antenna switching control signal generated by the antenna switcher 66, each variable phase shifter 75 gives a different phase amount to the packet receiving signal amplified by each amplifier 74 and outputs the signal to the receiver 63. Hence, the antenna unit 61B can switch, for example, the direction of the reception beam for receiving the packet receiving signal transmitted by the other wireless communication apparatus 50. In the following description, the direction of the transmission beam and the direction of the reception beam are easily referred to as the beam direction.

Figure 3:
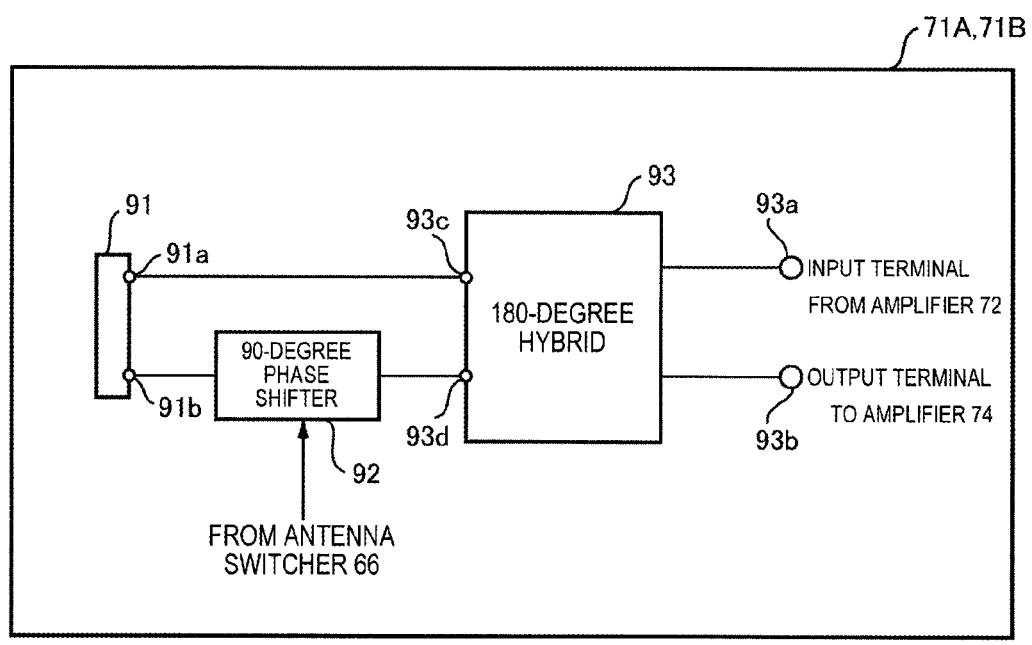
FIG. 3 is a view showing a circuit configuration of each of circularly-polarized wave antennas according to a first embodiment.

FIG. 3 is a view showing a circuit configuration of each of the circularly-polarized wave antennas 71A and 71B according to the first embodiment. Each of the circularly-polarized wave antennas 71A and 71B shown in FIG. 3 is, for example, a two-point feeding-type circularly-polarized wave patch antenna and includes a two-terminal feeding-type circularly-polarized wave antenna 91, a 90-degree phase shifter 92 and a 180-degree hybrid 93.

The two-terminal feeding-type circularly-polarized wave antenna 91 has two input/output terminals 91a and 91b serving as feeding terminals, and radiates a left-handed or right-handed circularly-polarized wave in the case that the powers of two signals having a phase difference of 90-degrees are fed to the respective input/output terminals 91a and 91b.

When the packet transmission signal amplified by the amplifier 72 is input to the input terminal 93a, the 180-degree hybrid 93 generates, from the packet transmission signal, two packet transmission signals having a phase difference of 180-degrees and a ½ amplitude and outputs the signals to a pair of input/output terminals 93c and 93d. When two packet receiving signals having a phase difference of 0 degrees are input to the pair of input/output terminals 93c and 93d, the 180-degree hybrid 93 synthesizes the two packet receiving signals and outputs the synthesized packet receiving signal to the amplifier 74 via the output terminal 93b.

The 90-degree phase shifter 92 is connected between the input/output terminal 93d of the 180-degree hybrid 93 and the input/output terminal 91b of the two-terminal feeding-type circularly-polarized wave antenna 91. According to the antenna switching control signal generated by the antenna switcher 66, the 90-degree phase shifter 92 advances or delays the phase of the signal between the input/output terminal 93d of the 180-degree hybrid 93 and the input/output terminal 91b of the two-terminal feeding-type circularly-polarized wave antenna 91.

In the case that the packet transmission signal is transmitted at the circularly-polarized wave antenna 71A shown in FIG. 3, the signal power of the packet transmission signal input to the 180-degree hybrid 93 via the input terminal 93a is distributed to two signal powers. One of the signal powers is fed to the input/output terminal 91a of the two-terminal feeding-type circularly-polarized wave antenna 91, and the other signal power is fed to the input/output terminal 91b via the 90-degree phase shifter 92.

The phase difference between the signal powers fed to the two input/output terminals 91a and 91b of the two-terminal feeding-type circularly-polarized wave antenna 91 is 90-degrees. Hence, according to the antenna switching control signal generated by the antenna switcher 66, the two-terminal feeding-type circularly-polarized wave antenna 91 switches the polarity of the phase difference of 90 degrees (for example, −90 degrees or +90 degrees) at the 90-degree phase shifter 92, thereby radiating a left-handed or right-handed circularly-polarized wave.

For example, the circularly-polarized wave antenna 71A radiates a left-handed circularly-polarized wave in the case that the phase difference between the two signals input to the two-terminal feeding-type circularly-polarized wave antenna 91 is −90 degrees, and radiates a right-handed circularly-polarized wave in the case that the phase difference between the two signals is +90 degrees.

On the other hand, in the case that the packet receiving signal is received by the circularly-polarized wave antenna 71B shown in FIG. 3, two signals having the same rotation direction as the rotation direction at the time when the other wireless communication apparatus 50 transmits the packet receiving signal, that is, two signals having the polarity of the same phase difference of 90 degrees (for example, −90 degrees or +90 degrees), are output from the input/output terminals 91a and 91b of the two-terminal feeding-type circularly-polarized wave antenna 91.

One of the signals is input to the input/output terminal 93c of the 180-degree hybrid 93, and the other signal is input to the input/output terminal 93d of the 180-degree hybrid 93 via the 90-degree phase shifter 92. The 180-degree hybrid 93 synthesizes the two signals input to the input/output terminals 93c and 93d so that the phase difference therebetween becomes 0 degrees, and outputs the synthesized signal to the output terminal 93b.

The circularly-polarized wave antennas 71A and 71B may have a configuration different from that shown in FIG. 3, and the antennas may be configured using components other than the two-terminal feeding-type circularly-polarized wave antenna 91, the 90-degree phase shifter 92 and the 180-degree hybrid 93, provided that the phase relation between the input/output terminals 91a and 91b is proper in the case of signal transmission, or provided that the phase relation between the input/output terminals 93c and 93d is proper in the case of signal reception.

Figure 4A:
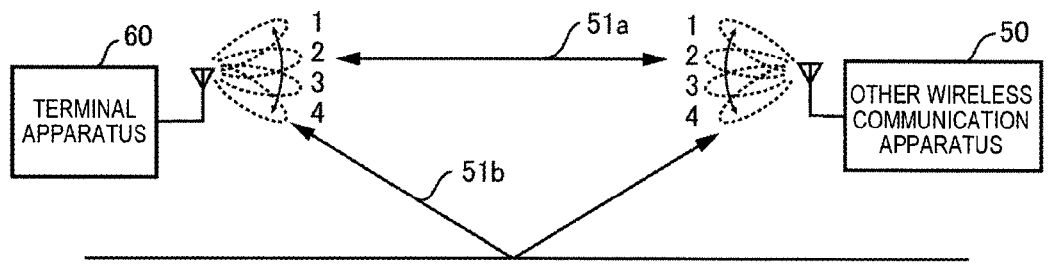

FIG. 4 is a view showing communication paths formed between the terminal apparatus 60 and the other wireless communication apparatus 50. FIG. 4(A) shows a case in which the communication characteristic at the communication path between the terminal apparatus 60 and the other wireless communication apparatus 50 is not changed.

In FIG. 4(A), the terminal apparatus 60 and the other wireless communication apparatus 50 are disposed so as to be opposed to each other. In FIG. 4, for ease of description, the terminal apparatus 60 and the other wireless communication apparatus 50 are described such that four beam directions are switched sequentially and the respective beam directions are respectively indicated "1, 2, 3, 4" in this order from the upside in the figure.

The communication path 51a shown in FIG. 4(A) is a communication path using a direct wave. For example, in the communication path 51a using the direct wave shown in FIG. 4(A), the beam direction in which the most satisfactory communication characteristic is acquired is the beam direction in which line-of-sight communication is performed between the terminal apparatus 60 and the other wireless communication apparatus 50, that is, the beam direction corresponding to beam number 2 in which the direct wave is received and communication is made possible.

The communication path 51b shown in FIG. 4(A) is a communication path using a reflected wave. For example, in the communication path 51b using the reflected wave shown in FIG. 4(A), the beam direction in which the most satisfactory communication characteristic is acquired is the beam direction corresponding to beam number 4.

Figure 4B:
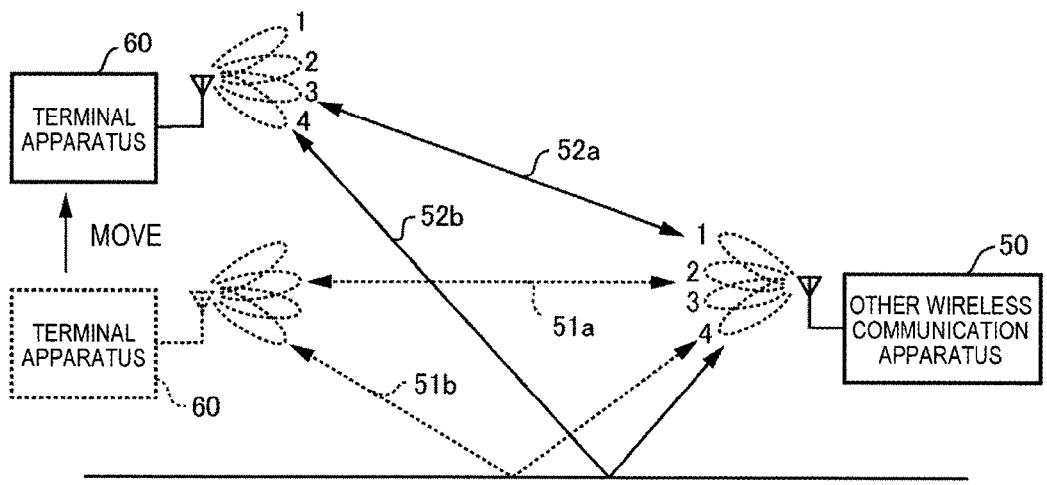

FIG. 4(B) shows communication paths between the terminal apparatus 60 and the other wireless communication apparatus 50 in the case that the terminal apparatus 60 was moved to the upper position shown in FIG. 4(B). The communication path 52a shown in FIG. 4(B) is a communication path using a direct wave, and the most satisfactory communication characteristic is also acquired in the case that the terminal apparatus 60 uses the beam direction corresponding to beam number 3 and that the other wireless communication apparatus 50 uses the beam direction corresponding to beam number 1.

The communication path 52b shown in FIG. 4(B) is a communication path using a reflected wave. For example, the most satisfactory communication characteristic is acquired in the case that the terminal apparatus 60 uses the beam direction corresponding to beam number 4 and that the other wireless communication apparatus 50 uses the beam direction corresponding to beam number 4.

Figure 4C:
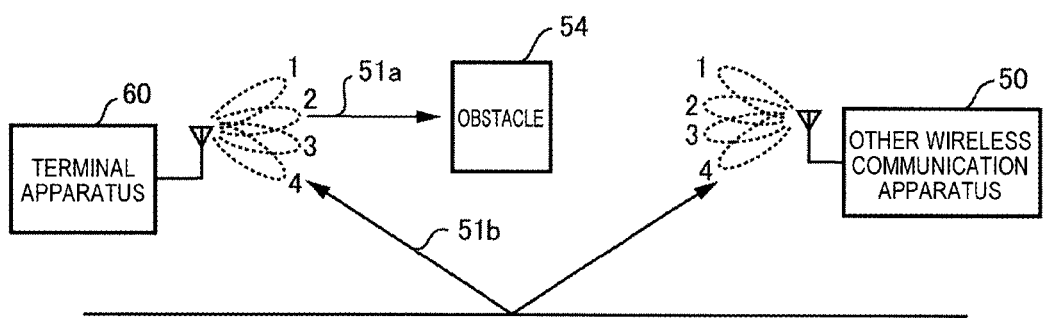

FIG. 4(C) shows communication paths between the terminal apparatus 60 and the other wireless communication apparatus 50 in the case that an obstacle 54 intervened therebetween. In the case that the obstacle 54 (for example, a human hand) intervenes between the terminal apparatus 60 and the other wireless communication apparatus 50, the direct wave from the terminal apparatus 60 does not reach the other wireless communication apparatus 50 (see the communication path 51a shown in FIG. 4(C)).

In FIG. 4(C), the obstacle 54 does not intervene in the communication path 51b in which the reflected wave is used. Hence, in the communication path 51b shown in FIG. 4(C), the most satisfactory communication characteristic is acquired in the case that the terminal apparatus 60 uses the beam direction corresponding to beam number 4 and that the other wireless communication apparatus 50 uses the beam direction corresponding to beam number 4.

FIG. 5 is a table showing the relationship among the polarized wave radiated by the antenna of the terminal apparatus 60, the polarized wave radiated by the antenna of the other wireless communication apparatus 50 and the communication characteristic therebetween.

In the case that the antenna unit 61 of the terminal apparatus 60 and the antenna of the other wireless communication apparatus 50 radiate linearly-polarized waves as in patterns 1 and 4 shown in FIG. 5, when the polarization planes of the respective linearly-polarized waves (for example, horizontally-polarized wave and vertically-polarized wave) are coincident with each other, the communication characteristic between the terminal apparatus 60 and the other wireless communication apparatus 50 is satisfactory. For example, in the case that the terminal apparatus 60 and the other wireless communication apparatus 50 use vertically-polarized waves, the communication characteristic between the terminal apparatus 60 and the other wireless communication apparatus 50 is satisfactory.

On the other hand, in the case that the polarization planes of the respective linearly-polarized waves are different by 90 degrees as in patterns 2 and 3 shown in FIG. 5, poor communication occurs between the terminal apparatus 60 and the other wireless communication apparatus 50. For example, in the case that the terminal apparatus 60 radiates a vertically-polarized wave and that the other wireless communication apparatus 50 radiates a horizontally-polarized wave, poor communication occurs between the terminal apparatus 60 and the other wireless communication apparatus 50.

Furthermore, in the case that one of the antenna unit 61 of the terminal apparatus 60 and the antenna of the other wireless communication apparatus 50 radiates a linearly-polarized wave and the other radiates a circularly-polarized wave as in patterns 5, 6, 7 and 8 shown in FIG. 5, the communication characteristic between the terminal apparatus 60 and the other wireless communication apparatus 50 is satisfactory even though the other wireless communication apparatus 50 and the terminal apparatus 60 are rotated, although the reception power becomes half (½). For example, in the case that the terminal apparatus 60 radiates a vertically-polarized wave and that the other wireless communication apparatus 50 radiates a right-handed circularly-polarized wave as in pattern 5 shown in FIG. 5, the signal power between the terminal apparatus 60 and the other wireless communication apparatus 50 is reduced by half; however, the communication characteristic is satisfactory even though the other wireless communication apparatus 50 and the terminal apparatus 60 are rotated.

Moreover, in the case that both the antenna unit 61 of the terminal apparatus 60 and the antenna of the other wireless communication apparatus 50 radiate circularly-polarized waves as in patterns 9 and 12 shown in FIG. 5, the communication characteristic between the terminal apparatus 60 and the other wireless communication apparatus 50 is satisfactory, provided that the circularly-polarized waves are coincident in the rotation direction (for example, the left-handed direction or the right-handed direction). For example, in the case that each of the antennas of the terminal apparatus 60 and the other wireless communication apparatus 50 uses a right-handed circularly-polarized wave, the communication characteristic between the terminal apparatus 60 and the other wireless communication apparatus 50 is satisfactory.

On the other hand, in the case that the rotation directions of the respective circularly-polarized waves are different as in patterns 10 and 11 shown in FIG. 5, poor communication occurs between the terminal apparatus 60 and the other wireless communication apparatus 50. For example, in the case that the terminal apparatus 60 radiates a right-handed circularly-polarized wave and the other wireless communication apparatus 50 radiates a left-handed circularly-polarized wave, poor communication occurs between the terminal apparatus 60 and the other wireless communication apparatus 50.

(Communication Operation Procedure of the Terminal Apparatus 60)

Figure 6:
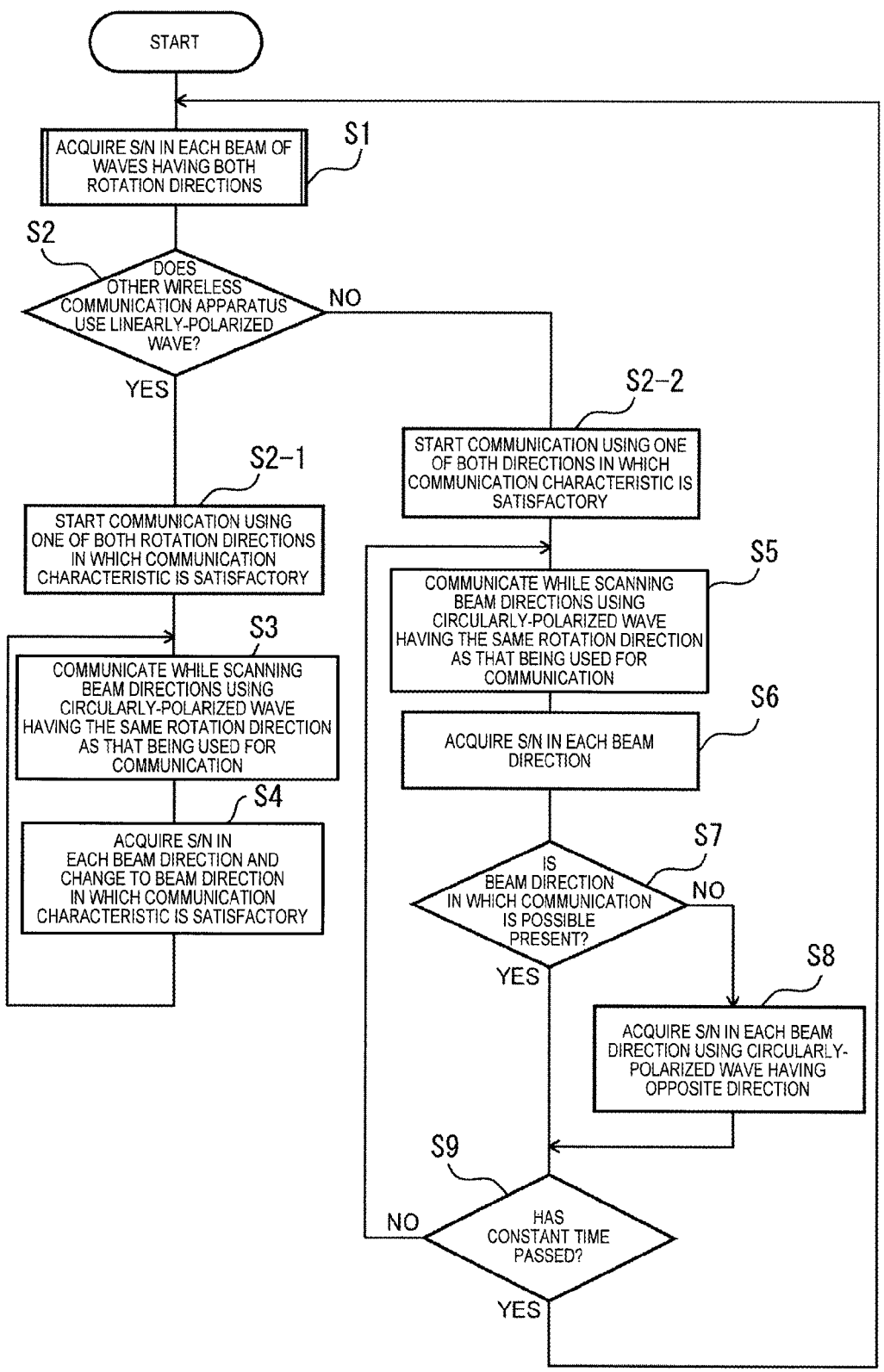
FIG. 6 is a flow chart describing the communication operation procedure in the terminal apparatus according to the first embodiment.

Next, the communication operation procedure in the terminal apparatus 60 according to this embodiment will be described referring to FIG. 6. FIG. 6 is a flow chart describing the communication operation procedure in the terminal apparatus 60 according to the first embodiment. The description in FIG. 6 is given assuming that the antenna unit 61 of the terminal apparatus 60 radiates a left-handed or right-handed circularly-polarized wave.

Figure 7:
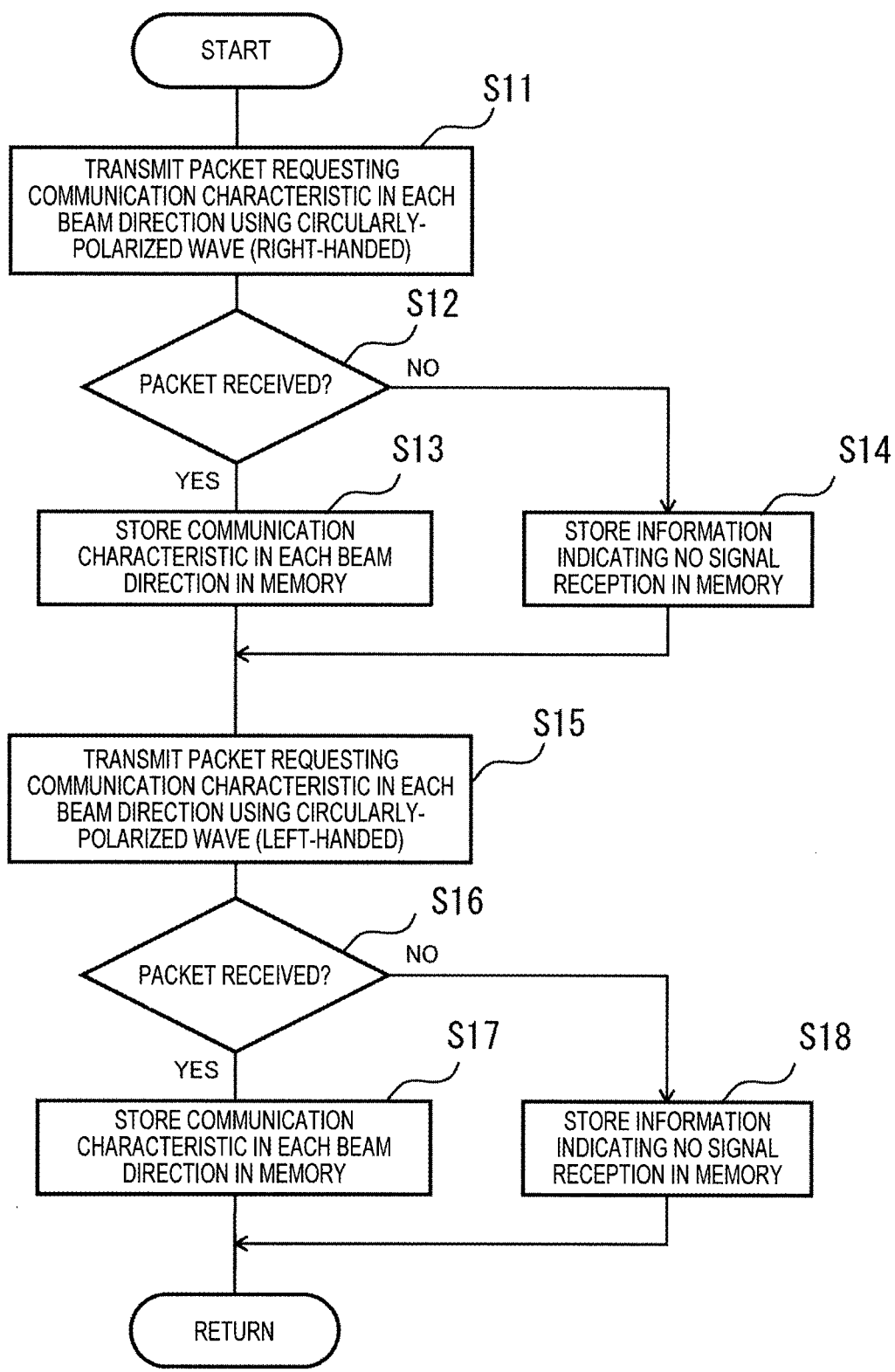
FIG. 7 is a flow chart describing the operation procedure for determining the shape of the antenna of the other wireless communication apparatus at step S1 shown in FIG. 6.

In FIG. 6, before the wireless communication between the terminal apparatus 60 and the other wireless communication apparatus 50 is started, the communication controller 64 determines the shape of the antenna of the other wireless communication apparatus 50, that is, the type of the polarized wave radiated by the antenna of the other wireless communication apparatus 50 (see FIG. 7). More specifically, the communication controller 64 causes the antenna switcher 66 to switch the rotation direction and the beam direction of the circularly-polarized wave radiated by the antenna unit 61, thereby acquiring the communication characteristic in each beam direction in the circularly-polarized waves having both rotation directions (at S1).

(Operation Procedure for Determining the Shape of the Antenna of the Other Wireless Communication Apparatus 50)

FIG. 7 is a flow chart describing the operation procedure for determining the shape of the antenna of the other wireless communication apparatus 50 at step S1 shown in FIG. 6.

In FIG. 7, the communication controller 64 switches the rotation direction of the circularly-polarized wave radiated by the antenna unit 61 to, for example, the right-handed direction, outputs an instruction for switching the beam direction of the right-handed circularly-polarized wave to the antenna switcher 66, and further generates a communication characteristic acquisition request for requesting the communication characteristic between the terminal apparatus and the other wireless communication apparatus 50 and then outputs the request to the transmitter 62.

According to the instruction of the communication controller 64, the antenna switcher 66 switches the rotation direction of the circularly-polarized wave radiated by the antenna unit 61 to the right-handed direction and generates an antenna switching control signal for switching the beam direction of the right-handed circularly-polarized wave and then outputs the signal to the antenna unit 61.

According to the communication characteristic acquisition request generated by the communication controller 64, the transmitter 62 generates, for example, a packet transmission signal for requesting the communication characteristic between the terminal apparatus and the other wireless communication apparatus 50, and outputs the signal to the antenna unit 61. According to the antenna switching control signal generated by the antenna switcher 66, the antenna unit 61 transmits the packet transmission signal generated by the transmitter 62 in each of all beam directions using the right-handed circularly-polarized wave (at S11).

Upon receiving the packet transmission signal transmitted using the right-handed circularly-polarized wave, the other wireless communication apparatus 50 returns a packet receiving signal including information indicating the communication characteristic in each beam direction to the terminal apparatus 60.

In the case that the packet receiving signal has been received from the other wireless communication apparatus 50 (YES at S12), the terminal apparatus 60 outputs the packet receiving signal to the receiver 63 via the antenna unit 61. The receiver 63 demodulates the packet receiving signal output by the antenna unit 61 and outputs the result of the demodulation of the packet receiving signal to the antenna detector 65.

On the basis of the result of the demodulation of the packet receiving signal of the receiver 63, the antenna detector 65 stores information indicating the communication characteristic between the terminal apparatus and the other wireless communication apparatus 50 in each beam direction in memory (not shown) (at S13). In other words, the antenna detector 65 stores information indicating the communication characteristic in each of all beam directions in the case that the right-handed circularly-polarized wave was used and instructs the communication controller 64 to perform the next operation, that is, to acquire information indicating the communication characteristic in each of all beam directions in the case that the left-handed circularly-polarized wave was used.

In the case that the other wireless communication apparatus 50 returned information indicating the communication characteristic in the beam direction in which the most satisfactory communication characteristic was acquired, or returned the packet receiving signal including the information on the beam direction in which the most satisfactory communication characteristic was acquired, the antenna detector 65 may store the information indicating the communication characteristic in the beam direction in which the most satisfactory communication characteristic was acquired or the information on the beam direction in which the most satisfactory communication characteristic was acquired; the same applies to the following respective embodiments.

On the other hand, in the case that no signal is returned from the other wireless communication apparatus 50 even after a constant time has passed after the terminal apparatus 60 transmitted the packet transmission signal in each beam direction (NO at S12), the antenna detector 65 stores information indicating that no signal is returned, that is, no signal is received, in each corresponding beam direction (at S14), and instructs the communication controller 64 to perform the next operation, that is, to acquire the information indicating the communication characteristic in each beam direction in the case that the left-handed circularly-polarized wave was used.

Next, the communication controller 64 switches the rotation direction of the circularly-polarized wave radiated by the antenna unit 61 to the left-handed direction, outputs an instruction for switching the beam direction of the left-handed circularly-polarized wave to the antenna switcher 66, and further generates a communication characteristic acquisition request for requesting the communication characteristic between the terminal apparatus and the other wireless communication apparatus 50 and then outputs the request to the transmitter 62.

According to the instruction of the communication controller 64, the antenna switcher 66 switches the rotation direction of the circularly-polarized wave radiated by the antenna unit 61 to the left-handed direction and generates an antenna switching control signal for switching the beam direction of the left-handed circularly-polarized wave and then outputs the signal to the antenna unit 61.

According to the communication characteristic acquisition request generated by the communication controller 64, the transmitter 62 generates a packet transmission signal for requesting the communication characteristics between the terminal apparatus and the other wireless communication apparatus 50 and outputs the signal to the antenna unit 61. According to the antenna switching control signal generated by the antenna switcher 66, the antenna unit 61 transmits the packet transmission signal generated by the transmitter 62 in each of all beam directions using the left-handed circularly-polarized wave (at S15).

Upon receiving the packet transmission signal transmitted using the left-handed circularly-polarized wave, the other wireless communication apparatus 50 returns a packet receiving signal including information indicating the communication characteristic in each beam direction to the terminal apparatus 60.

In the case that the packet receiving signal has been received from the other wireless communication apparatus 50 (YES at S16), the terminal apparatus 60 outputs the packet receiving signal to the receiver 63 via the antenna unit 61. The receiver 63 demodulates the packet receiving signal output by the antenna unit 61 and outputs the result of the demodulation of the packet receiving signal to the antenna detector 65.

On the basis of the result of the demodulation of the packet receiving signal of the receiver 63, the antenna detector 65 stores information indicating the communication characteristic between the terminal apparatus and the other wireless communication apparatus 50 in each beam direction in memory (not shown) (at S17). In other words, the antenna detector 65 stores information indicating the communication characteristic in each of all beam directions in the case that the left-handed circularly-polarized wave was used. This completes the operation procedure for determining the shape of the antenna of the other wireless communication apparatus 50 shown in FIG. 7, and the communication operation procedure of the terminal apparatus 60 returns to step S2 of the flow chart shown in FIG. 6.

On the other hand, in the case that no signal is returned from the other wireless communication apparatus 50 even after a constant time has passed after the terminal apparatus 60 transmitted the packet transmission signal in each beam direction (NO at S16), the antenna detector 65 stores information indicating that no signal is returned, that is, no signal is received, in each corresponding beam direction (at S18). This completes the operation procedure for determining the shape of the antenna of the other wireless communication apparatus 50 shown in FIG. 7, and the communication operation procedure of the terminal apparatus 60 returns to step S2 of the flow chart shown in FIG. 6.

In FIG. 7, the terminal apparatus 60 first radiated the right-handed circularly-polarized wave and then radiated the left-handed circularly-polarized wave; however, with respect to the sequence of the rotation direction, either the left-handed direction or the right-handed direction may be used first.

In FIG. 6, the antenna detector 65 compares the information indicating the communication characteristic in each beam direction in the case that the right-handed circularly-polarized wave was used with the information indicating the communication characteristic in each beam direction in the case that the left-handed circularly-polarized wave was used.

On the basis of the result of the comparison between the information indicating the communication characteristic in each beam direction in the case that the right-handed circularly-polarized wave was used and the information indicating the communication characteristic in each beam direction in the case that the left-handed circularly-polarized wave was used, the antenna detector 65 determines whether the shape of the antenna of the other wireless communication apparatus 50 is a circularly-polarized wave antenna or a linearly-polarized wave antenna (at S2).

Figure 8:
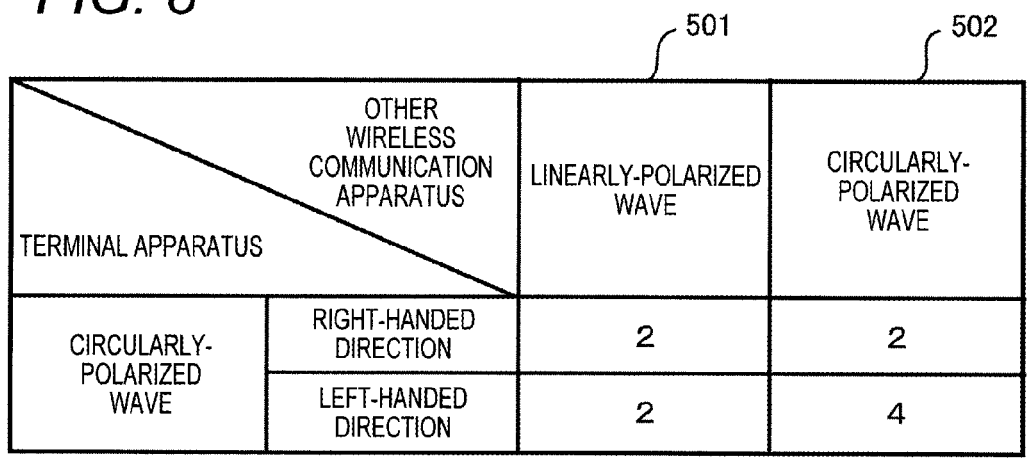
FIG. 8 is a table showing the result of the comparison with respect to the communication characteristic in each polarized wave radiated by the antenna of the other wireless communication apparatus in the case that the terminal apparatus in which four beam directions are switched sequentially used circularly-polarized waves.

FIG. 8 is a table showing the result of the comparison with respect to the communication characteristic in each polarized wave radiated by the antenna of the other wireless communication apparatus 50 in the case that the terminal apparatus 60, in which four beam directions are switched sequentially, used circularly-polarized waves. FIG. 8 shows the result of the comparison with respect to the beam direction in which the most satisfactory communication characteristic was acquired in the case that the terminal apparatus 60 used the left-handed and right-handed circularly-polarized waves, that the other wireless communication apparatus 50 used the linearly-polarized wave and the circularly-polarized wave, and that the beam direction was switched. Each of the numerical values (for example, 2, 4) shown in FIG. 8 represents the beam number of the beam direction in which the most satisfactory communication characteristic was acquired (see FIG. 4).

More specifically, in the case that the left-handed circularly-polarized wave and the right-handed circularly-polarized wave were used and in the case that the difference in the communication characteristic between the terminal apparatus 60 and the other wireless communication apparatus 50 is within a predetermined range or the beam numbers of the beam directions in which the most satisfactory communication characteristic was acquired are the same (see the column 501 shown in FIG. 8), the antenna detector 65 determines that the shape of the antenna of the other wireless communication apparatus 50 is a linearly-polarized wave antenna.

This is because although power is reduced by half theoretically in the case that the circularly-polarized wave was received by a linearly-polarized wave or a linearly-polarized wave was received by a circularly-polarized wave (see FIG. 5), the right-handed circularly-polarized wave and the left-handed circularly-polarized wave are received so as to provide the same communication characteristic.

Furthermore, in communication in which the direct wave (see the communication path 51a shown in FIG. 4) or the reflected wave (see the communication path 51b shown in FIG. 4) was used, even though the linearly-polarized wave is reflected by a wall or the ground, the polarization plane thereof is not changed. Hence, in the case that the shape of the antenna of the other wireless communication apparatus 50 is a linearly-polarized wave antenna, the same communication characteristic is acquired regardless of whether a right-handed circularly-polarized wave or a left-handed circularly-polarized wave is radiated.

On the other hand, in the case that the left-handed circularly-polarized wave and the right-handed circularly-polarized wave were used, the antenna detector 65 determines that the shape of the antenna of the other wireless communication apparatus 50 is a circularly-polarized wave antenna in the case that the difference in the communication characteristic between the terminal apparatus 60 and the other wireless communication apparatus 50 is not within the predetermined range, in the case that the beam numbers of the beam directions in which the most satisfactory communication characteristics were acquired are different (see the column 502 shown in FIG. 8) or in the case that no signal was returned in response to the radiation of the left-handed or right-handed circularly-polarized wave.

This is because the rotation direction is changed when the circularly-polarized wave is reflected once by a wall or the ground. For example, a left-handed circularly-polarized wave is changed to a right-handed circularly-polarized wave by one reflection, and a right-handed circularly-polarized wave is changed to a left-handed circularly-polarized wave by one reflection. In the case that a circularly-polarized wave is reflected even-numbered times by a wall or the ground, its rotation direction returns to its original rotation direction.

For example, in the case that the shape of the antenna of the other wireless communication apparatus 50 is a circularly-polarized wave antenna for radiating a right-handed circularly-polarized wave and that the terminal apparatus 60 radiates a right-handed circularly-polarized wave, the other wireless communication apparatus 50 can receive the direct wave (see the communication path 51a shown in FIG. 4) or the reflected wave reflected even-numbered times. The other wireless communication apparatus 50 can return a packet transmission signal including the communication characteristic of the direct wave or the reflected wave reflected even-numbered times. Since the other wireless communication apparatus 50 radiates a right-handed circularly-polarized wave, the terminal apparatus 60 can receive the direct wave or the reflected wave reflected even-numbered times.

Moreover, in the case that the terminal apparatus 60 radiated a left-handed circularly-polarized wave, it is difficult for the other wireless communication apparatus 50 to receive the left-handed circularly-polarized wave because the other wireless communication apparatus can receive a right-handed circularly-polarized wave, however, the other wireless communication apparatus can receive the reflected wave reflected odd-numbered times. The other wireless communication apparatus 50 can return a packet transmission signal including the communication characteristic of the reflected wave reflected odd-numbered times. Since the other wireless communication apparatus 50 radiates a right-handed circularly-polarized wave, the terminal apparatus 60 can receive the reflected wave reflected odd-numbered times.

Hence, the antenna detector 65 can easily determine whether the shape of the antenna of the other wireless communication apparatus 50 is a circularly-polarized wave antenna or a linearly-polarized wave antenna, that is, whether the polarized wave radiated by the antenna of the other wireless communication apparatus 50 is a circularly-polarized wave or a linearly-polarized wave. Although the above description has been given assuming a case in which the other wireless communication apparatus 50 has a circularly-polarized wave antenna radiating a right-handed circularly-polarized wave, the description is similarly applicable to a case in which the apparatus has a left-handed antenna.

After determining the shape of the antenna of the other wireless communication apparatus 50, the antenna detector 65 outputs the result of the determination to the communication controller 64. According to the result of the determination of the shape of the antenna of the other wireless communication apparatus 50, the communication controller 64 instructs the antenna switcher 66 to switch the rotation direction and the beam direction of the circularly-polarized wave and starts communication between the terminal apparatus 60 and the other wireless communication apparatus 50.

The operation procedure for determining the shape of the antenna at step S1 may be performed periodically, for example, during sleep, instead of before the start of the communication between the terminal apparatus 60 and the other wireless communication apparatus 50, and this applies similarly to the following respective embodiments.

(Communication Operation Procedure in the Case that the Other Wireless Communication Apparatus 50 has a Linearly-Polarized Wave Antenna)

A case in which the communication characteristic during the communication between the terminal apparatus 60 and the other wireless communication apparatus 50 changes is assumed to be, for example, a case in which the terminal apparatus 60 is moved (see FIG. 4(B) or a case in which the obstacle 54 intervenes between the terminal apparatus 60 and the other wireless communication apparatus 50 (see FIG. 4(C)).

For ease of the following description, the case in which the terminal apparatus 60 is moved is described; however, the description is applied similarly to a case in which the other wireless communication apparatus 50 is moved or a case in which both the terminal apparatus 60 and the other wireless communication apparatus 50 are moved.

In the case that the communication controller 64 determines that the shape of the antenna of the other wireless communication apparatus 50 is a linearly-polarized wave antenna (YES at S2), the communication controller 64 switches the rotation direction of the circularly-polarized wave radiated by the antenna unit 61 to the rotation direction (for example, the right-handed direction) of the circularly-polarized wave in which the most satisfactory communication characteristic was acquired at step S1, outputs, to the antenna switcher 66, an instruction for switching the beam direction, from the beam directions of the right-handed direction, to the beam direction of the circularly-polarized wave in which the most satisfactory communication characteristic was acquired, and starts communication (at S2-1).

Then, at step S3, as shown in FIG. 4, in consideration of the change in the communication characteristic between the other wireless communication apparatus 50 and the terminal apparatus 60, at predetermined time intervals, the communication controller 64 generates a communication characteristic acquisition request for requesting the communication characteristic between the terminal apparatus and the other wireless communication apparatus 50 and outputs the request to the transmitter 62.

However, at step S3, even in the case that the instruction of the communication controller 64 was given, the antenna switcher 66 does not switch the rotation direction of the circularly-polarized wave radiated by the antenna unit 61. The reason for this is that the communication characteristic is not changed depending on the rotation direction since the other wireless communication apparatus 50 uses a linearly-polarized wave.

According to the communication characteristic acquisition request generated by the communication controller 64, the transmitter 62 generates, for example, a packet transmission signal for requesting the communication characteristic between the terminal apparatus and the other wireless communication apparatus 50 and outputs the signal to the antenna unit 61.

According to the antenna switching control signal generated by the antenna switcher 66, the antenna unit 61 transmits the packet transmission signal generated by the transmitter 62 in each of all beam directions using a right-handed circularly-polarized wave having the same rotation direction as that being used for the communication at step S2-1.

Next, at step S4, the other wireless communication apparatus 50 receives the packet transmission signal transmitted by the terminal apparatus 60 through the communication path 52a or 52b in the case that the terminal apparatus 60 was moved or through the communication path 51b in the case that the obstacle 54 intervened between the terminal apparatus 60 and the other wireless communication apparatus 50.

After receiving the packet transmission signal transmitted using the right-handed circularly-polarized wave, the other wireless communication apparatus 50 returns a packet receiving signal including the information indicating the communication characteristic in each beam direction to the terminal apparatus 60.

The terminal apparatus 60 receives the packet transmission signal transmitted by the other wireless communication apparatus 50 through the communication path 52a or 52b in the case that the terminal apparatus 60 was moved or through the communication path 51b in the case that the obstacle 54 intervened between the terminal apparatus 60 and the other wireless communication apparatus 50.

The terminal apparatus 60 outputs the packet receiving signal received from the other wireless communication apparatus 50 to the receiver 63 via the antenna unit 61. The receiver 63 demodulates the packet receiving signal output by the antenna unit 61 and outputs the result of the demodulation of the packet receiving signal to the communication controller 64.

On the basis of the result of the demodulation of the packet receiving signal of the receiver 63, the communication controller 64 acquires the information indicating the communication characteristic between the terminal apparatus 60 and the other wireless communication apparatus 50 in each beam direction and stores the information in memory (not shown), thereby acquiring S/N in each beam direction. An instruction for switching the antenna to the beam direction in which S/N more satisfactory than the acquired S/N is acquired is output to the antenna switcher 66. On the basis of the antenna switching instruction, the antenna switcher 66 controls the antenna unit 61.

Then, the communication controller 64 repeats the respective operations of step S3 and step S4.

Hence, the communication controller 64 can monitor the communication characteristic between the terminal apparatus 60 and the other wireless communication apparatus 50 and can avoid packet loss. Furthermore, since the terminal apparatus 60 can determine that the shape of the antenna of the other wireless communication apparatus 50 is a linearly-polarized wave antenna, the terminal apparatus 60 may merely transmit the packet transmission signal for acquiring the communication characteristic between the terminal apparatus and the other wireless communication apparatus 50 using a circularly-polarized wave having the rotation direction (the left-handed direction or the right-handed direction) in which the most satisfactory communication characteristic was acquired at step S1.

As the beam direction for use in communication, directions other than the direction in which the most satisfactory communication characteristic is acquired can be selected, provided that the communication characteristic is satisfactory.

Hence, in the case that the terminal apparatus 60 starts communication between the terminal apparatus 60 and the other wireless communication apparatus 50, the terminal apparatus 60 is not required to perform switching between the left-handed circularly-polarized wave and the right-handed circularly-polarized wave and to acquire the communication characteristic between the terminal apparatus 60 and the other wireless communication apparatus 50, whereby the power consumption required for acquiring the communication characteristic between the terminal apparatus and the other wireless communication apparatus 50 can be reduced and the communication between the terminal apparatus and the other wireless communication apparatus 50 can be started easily.

Upon detecting the degradation in communication characteristic or packet loss at every constant time, the communication controller 64 may transmit the packet transmission signal for acquiring the communication characteristic using a circularly-polarized wave having the same rotation direction as the rotation direction being used for communication in each beam direction.

Figure 9:
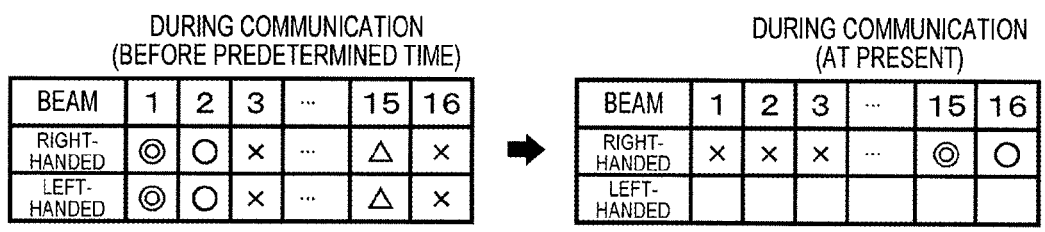
FIG. 9 is a table briefly showing an example of the result of the communication characteristic acquired periodically during communication in each beam direction in the case that the other wireless communication apparatus has a linearly-polarized wave antenna.

FIG. 9 is a table briefly showing an example of the result of the communication characteristic acquired periodically during communication in each beam direction in the case that the other wireless communication apparatus 50 has a linearly-polarized wave antenna. FIG. 9 describes a case in which the number of the beam directions is 16. The number of the beam directions is not limited to 4 shown in FIG. 4 or 16 shown in FIG. 9, but an arbitrary number may be used.

FIG. 9 shows the result obtained in the case that the beam directions of the circularly-polarized waves having both the rotation directions are switched (scanned) from beam number 1 to beam number 16 during communication before a predetermined time from the present time, and the communication characteristic in the beam direction of each of the circularly-polarized waves having both the rotation directions, corresponding to beam number 1, was the most satisfactory (see the left side of the arrow shown in FIG. 9).

In FIG. 9, since the terminal apparatus 60 can determine that the shape of the antenna of the other wireless communication apparatus 50 is a linearly-polarized wave antenna, the terminal apparatus 60 performs switching to the right-handed direction and the beam direction in which the most satisfactory communication characteristic was acquired during communication before the predetermined time from the present time and acquires the communication characteristic between the terminal apparatus and the other wireless communication apparatus 50. In FIG. 9, the communication characteristic in the beam direction corresponding to beam number 15 in which the right-handed circularly-polarized wave was used was the most satisfactory (see the right side of the arrow shown in FIG. 9).

Since the beam direction in which the most satisfactory communication characteristic was acquired becomes different although the rotation direction of the circularly-polarized wave is not changed, the terminal apparatus 60 can detect the movement of the terminal apparatus 60 itself, and the terminal apparatus 60 scans the beam directions of the circularly-polarized wave having one rotation direction (for example, the right-handed direction in FIG. 9), instead of both the rotation directions.

Hence, since the terminal apparatus 60 can determine that the shape of the antenna of the other wireless communication apparatus 50 is a linearly-polarized wave antenna, the terminal apparatus 60 scans the beam directions of the circularly-polarized wave having one rotation direction (for example, the right-handed direction in FIG. 9), instead of both the rotation directions, whereby the power consumption required for acquiring the communication characteristic between the terminal apparatus and the other wireless communication apparatus 50 can be reduced.

(Communication Operation Procedure in the Case that the Other Wireless Communication Apparatus 50 has a Circularly-Polarized Wave Antenna)

1. In a Case in which the Terminal Apparatus 60 was Moved

First, the communication operation procedure of the terminal apparatus 60 in the case that the terminal apparatus 60 was moved during communication between the terminal apparatus 60 and the other wireless communication apparatus 50 will be described (see FIG. 4(B)). The following description is given assuming that the antenna of the other wireless communication apparatus 50 radiates, for example, a right-handed circularly-polarized wave.

In the case that the communication controller 64 determines that the shape of the antenna of the other wireless communication apparatus 50 is a circularly-polarized wave antenna (NO at S2), the communication controller 64 switches the rotation direction of the circularly-polarized wave radiated by the antenna unit 61 to the rotation direction (for example, the right-handed direction) of the circularly-polarized wave in which the most satisfactory communication characteristic was acquired at step S1, outputs, to the antenna switcher 66, an instruction for switching the beam direction, from the beam directions of the right-handed direction, to the beam direction of the circularly-polarized wave in which the most satisfactory communication characteristic was acquired, and starts communication (at S2-2).

Then, at step S5, as shown in FIG. 4, in consideration of the change in the communication characteristic between the other wireless communication apparatus 50 and the terminal apparatus 60, at predetermined time intervals, the communication controller 64 generates a communication characteristic acquisition request for requesting the communication characteristic between the terminal apparatus and the other wireless communication apparatus 50 and outputs the request to the transmitter 62 (at S5).

However, at step S5, even in the case that the instruction of the communication controller 64 was given, the antenna switcher 66 does not switch the rotation direction of the circularly-polarized wave radiated by the antenna unit 61. The reason for this is that although the communication characteristic changes depending on the rotation direction since the other wireless communication apparatus 50 uses a circularly-polarized wave, the number of beam direction scanning times (the switching of the rotation direction) can be reduced depending on the cause of communication interruption.

According to the communication characteristic acquisition request generated by the communication controller 64, the transmitter 62 generates, for example, a packet transmission signal for requesting the communication characteristic between the terminal apparatus and the other wireless communication apparatus 50 and outputs the signal to the antenna unit 61. According to the antenna switching control signal generated by the antenna switcher 66, the antenna unit 61 transmits the packet transmission signal generated by the transmitter 62 in each of all beam directions using a right-handed circularly-polarized wave having the same rotation direction as that being used for the communications at step S2-2.

Next, at step S6, the other wireless communication apparatus 50 receives the packet transmission signal transmitted by the terminal apparatus 60 through the communication path 52a in the case that the terminal apparatus 60 was moved (see FIG. 4(B)).

However, for ease of description, it is assumed that the antenna of the other wireless communication apparatus 50 is a circularly-polarized wave antenna for radiating a right-handed circularly-polarized wave, in the case that the terminal apparatus 60 was moved, the other wireless communication apparatus 50 can receive the packet transmission signal transmitted by the terminal apparatus 60 through the communication path 52a. In the case of the communication path 52b, when the right-handed circularly-polarized wave is reflected once by the ground, the wave is changed to a left-handed circularly-polarized wave, whereby it is difficult to receive the wave using the antenna of the other wireless communication apparatus 50.

After receiving the packet transmission signal transmitted using the right-handed circularly-polarized wave, the other wireless communication apparatus 50 returns a packet receiving signal including the information indicating the communication characteristic in each beam direction to the terminal apparatus 60.

The terminal apparatus 60 receives the packet receiving signal transmitted by the other wireless communication apparatus 50 through the communication path 52a in the case that the terminal apparatus 60 was moved (see FIG. 4(B)).

However, since it is assumed that the antenna of the other wireless communication apparatus 50 is a circularly-polarized wave antenna radiating a right-handed circularly-polarized wave, the terminal apparatus 60 can receive the packet receiving signal transmitted by the other wireless communication apparatus 50 through the communication path 52a in the case that the terminal apparatus 60 was moved.

The terminal apparatus 60 outputs the packet receiving signal received from the other wireless communication apparatus 50 to the receiver 63 via the antenna unit 61. The receiver 63 demodulates the packet receiving signal output by the antenna unit 61 and outputs the result of the demodulation of the packet receiving signal to the communication controller 64.

On the basis of the result of the demodulation of the packet receiving signal of the receiver 63, the communication controller 64 acquires the information indicating the communication characteristic between the terminal apparatus 60 and the other wireless communication apparatus 50 in each of all beam directions and stores the information in memory (not shown), thereby acquiring S/N in each beam direction.

Next, after acquiring the information indicating the communication characteristic in each of all beam directions, the communication controller 64 judges at step S7 whether a beam direction in which the communication between the terminal apparatus 60 and the other wireless communication apparatus 50 can be made is present. In the case that the communication controller 64 judges that a beam direction in which the communications between the terminal apparatus 60 and the other wireless communication apparatus 50 can be made is present (YES at S7), the communication controller 64 switches the beam direction of the circularly-polarized wave radiated by the antenna unit 61 to the beam direction in which the most satisfactory communication characteristic was acquired and continues the communication between the terminal apparatus and the other wireless communication apparatus 50.

The communication controller 64 judges, using, for example, a timer, whether a constant time has passed after the beam direction of the circularly-polarized wave radiated by the antenna unit 61 was switched to the beam direction in which the most satisfactory communication characteristic was acquired (at S9). In the case that the constant time has not passed (NO at S9), the communication operation procedure of the terminal apparatus 60 returns to step S5

On the other hand, in the case that the constant time has passed (YES at S9), the communication operation procedure of the terminal apparatus 60 returns to step S1. The condition under which the communication operation procedure of the terminal apparatus 60 returns to step S1 has been described that the constant time has passed at step S9, however, the communication operation procedure at step S1 may herein be carried out, for example, at the timing when the terminal apparatus 60 detected packet loss.

The reason why the procedure herein returns to step S1 of the communication operation procedure, that is, the communication operation procedure for determining the shape of the antenna of the other wireless communication apparatus 50 in the case that the constant time has passed at step S9, is as described below.

Specifically, in the case that the obstacle 54 (see FIG. 4(C) intervenes between the terminal apparatus 60 and the other wireless communication apparatus 50 at the time when the operation procedure for determining the shape of the antenna of the other wireless communication apparatus 50 is carried out, the terminal apparatus 60 and the other wireless communication apparatus 50 communicate using a reflected wave (see reference numeral 51b shown in FIG. 4(C)).

Although it is essentially desired that communication should be performed using the direct wave (see the communication path 51a shown in FIG. 4(A)) in which the communication characteristic is most satisfactory, in the case that the communication using the reflected wave continues, the communication characteristic between the terminal apparatus 60 and the other wireless communication apparatus 50 is degraded in comparison with that in the case that the direct wave is used.

Hence, the reason why the procedure returns to step S1 of the communication operation procedure, that is, the communication operation procedure for determining the shape of the antenna of the other wireless communication apparatus 50 in the case that the constant time has passed at step S9 is to obtain an opportunity for performing switching to communication in which the direct wave (see the communication path 51a shown in FIG. 4(A)) is used between the terminal apparatus and the other wireless communication apparatus 50 even in the case that the communication using the reflected wave (see the communication path 51b shown in FIG. 4(C)) has continued, assuming a case in which the obstacle 54 is removed.

However, in the case that the constant time has passed at step S9, the procedure may not be required to return to step S1 of the communication operation procedure, that is, the communication operation procedure for determining the shape of the antenna of the other wireless communication apparatus 50. For example, the communication controller 64 may transmit the packet transmission signal for acquiring the communication characteristic from the antenna unit 61 using a circularly-polarized wave having the rotation direction opposite to the rotation direction being used for communication in each beam direction; the same applies to the following embodiments.

Hence, even in the case that the terminal apparatus 60 was moved during communication between the terminal apparatus 60 and the other wireless communication apparatus 50, the communication controller 64 can monitor the communication characteristic between the terminal apparatus 60 and the other wireless communication apparatus 50 in real time and can avoid packet loss in the case that the terminal apparatus 60 was moved.

2. In a Case in which the Obstacle 54 Intervened Between the Terminal Apparatus 60 and the Other Wireless Communication Apparatus 50

Next, the communication operation procedure of the terminal apparatus 60 in the case that the obstacle 54 intervened between the terminal apparatus 60 and the other wireless communication apparatus 50 (see FIG. 4(C)) during communication between the terminal apparatus 60 and the other wireless communication apparatus 50 will be described.

When the obstacle 54 intervenes in the case that the terminal apparatus 60 and the other wireless communication apparatus 50 have been performing communication using the communication path 51a (see FIG. 4(A)), the packet transmission signal transmitted by the terminal apparatus 60 does not reach the other wireless communication apparatus 50 (see FIG. 4(C)).

As a result, at step S7 shown in FIG. 6, the communication controller 64 judges that the beam direction in which communication between the terminal apparatus 60 and the other wireless communication apparatus 50 can be made is not present (NO at S7).

The communication controller 64 interrupts the transmission of the packet transmission signal that has been transmitted using the right-handed circularly-polarized wave having been switched at step S5. Furthermore, the communication controller 64 switches the rotation direction of the circularly-polarized wave radiated by the antenna unit 61 to the opposite direction, that is, the left-handed direction, outputs an instruction for switching the beam direction of the left-handed circularly-polarized wave to the antenna switcher 66, and further generates a communication characteristic acquisition request for requesting the communication characteristic between the terminal apparatus and the other wireless communication apparatus 50, and outputs the request to the transmitter 62.

According to the instruction of the communication controller 64, the antenna switcher 66 switches the rotation direction of the circularly-polarized wave radiated by the antenna unit 61 to the left-handed direction, generates an antenna switching control signal for switching the beam direction of the left-handed circularly-polarized wave, and outputs the signal to the antenna unit 61.

In response to the communication characteristic acquisition request generated by the communication controller 64, the transmitter 62 generates a packet transmission signal for requesting the communication characteristic between the terminal apparatus and the other wireless communication apparatus 50 and outputs the signal to the antenna unit 61. According to the antenna switching control signal generated by the antenna switcher 66, the antenna unit 61 transmits the packet transmission signal generated by the transmitter 62 in each beam direction using the left-handed circularly-polarized wave.

In the case that the obstacle 54 intervened between the terminal apparatus 60 and the other wireless communication apparatus 50, the other wireless communication apparatus 50 receives the packet transmission signal transmitted by the terminal apparatus 60 through the communication path 51*b*.

The packet transmission signal transmitted using the right-handed circularly-polarized wave is reflected once by the ground and switched to a left-handed circularly-polarized wave, and the packet transmission signal is received by the other wireless communication apparatus 50 through the communication path 51*b*. The other wireless communication apparatus 50 returns a packet receiving signal including the information indicating the communication characteristic in each beam direction to the terminal apparatus 60 using a right-handed circularly-polarized wave.

The packet transmission signal transmitted using the right-handed circularly-polarized wave is reflected once by the ground and switched to a left-handed circularly-polarized wave, and the packet transmission signal is received by the terminal apparatus 60 through the communication path 51*b*.

The terminal apparatus 60 outputs the packet receiving signal received from the other wireless communication apparatus 50 to the receiver 63 via the antenna unit 61. The receiver 63 demodulates the packet receiving signal output by the antenna unit 61 and outputs the result of the demodulation of the packet receiving signal to the communication controller 64.

On the basis of the result of the demodulation of the packet receiving signal of the receiver 63, the communication controller 64 reacquires the information indicating the communication characteristic between the terminal apparatus 60 and the other wireless communication apparatus 50 in each of all beam directions and stores the information in memory (not shown) (at S8). The communication controller 64 switches the beam direction of the left-handed circularly-polarized wave to the beam direction in which the communication characteristic between the terminal apparatus 60 and the other wireless communication apparatus 50 is the most satisfactory and continues communication between the terminal apparatus and the other wireless communication apparatus 50. Since the operation of the terminal apparatus 60 at step S8 and thereafter is the same as that described above, the description thereof will be omitted.

Hence, even in the case that the obstacle 54 intervened during communication between the terminal apparatus 60 and the other wireless communication apparatus 50, the communication controller 64 can continue communication by performing switching to the beam direction in which the communication characteristic is the most satisfactory, by using a reflected wave instead of a direct wave.

FIG. 10(A) is a table briefly showing an example of the result of the communication characteristic acquired periodically during communication in each beam direction in the case that the other wireless communication apparatus 50 has a circularly-polarized wave antenna. FIG. 10 describes a case in which the number of the beam directions is 16. The number of the beam directions is not limited to 4 shown in FIG. 4 or 16 shown in FIG. 10, but an arbitrary number may be used.

FIG. 10(A) shows the result obtained in the case that the beam directions of the circularly-polarized waves having both the rotation directions are switched (scanned) from beam number 1 to beam number 16 during communication before a predetermined time from the present time, and the communication characteristic in the beam direction of the right-handed circularly-polarized wave, corresponding to beam number 1, was the most satisfactory (see the left side of the arrow shown in FIG. 10(A)).

In FIG. 10(A), since the terminal apparatus 60 can determine that the shape of the antenna of the other wireless communication apparatus 50 is a right-handed circularly-polarized wave antenna, the terminal apparatus 60 performs switching to the right-handed direction and the beam direction in which the most satisfactory communication characteristic was acquired during communication before the predetermined time from the present time and acquires the communication characteristic between the terminal apparatus 60 and the other wireless communication apparatus 50. In FIG. 10(A), the communication characteristic in the beam direction corresponding to beam number 15 in which the right-handed circularly-polarized wave was used was the most satisfactory (see the right side of the arrow shown in FIG. 10(A)).

Since the beam direction in which the most satisfactory communication characteristic was acquired becomes different although the rotation direction of the circularly-polarized wave is not changed, the terminal apparatus 60 can detect the movement of the terminal apparatus 60 itself, and the terminal apparatus 60 scans the beam directions of the circularly-polarized wave having one rotation direction (for example, the right-handed direction in FIG. 10(A)), instead of both the rotation directions.

Hence, since the terminal apparatus 60 can determine that the shape of the antenna of the other wireless communication apparatus 50 is a right-handed circularly-polarized wave antenna, the terminal apparatus 60 scans the beam directions of the circularly-polarized wave having one rotation direction (for example, the right-handed direction in FIG. 10(A)), instead of both the rotation directions, whereby the power consumption required for acquiring the communication characteristic between the terminal apparatus and the other wireless communication apparatus 50 can be reduced.

FIG. 10(B) is a table briefly showing an example of the result of the communication characteristic after communication interruption in each beam direction in the case that the other wireless communication apparatus 50 has a circularly-polarized wave antenna.

FIG. 10(B) shows the result obtained in the case that the beam directions of the circularly-polarized waves having both the rotation directions are switched (scanned) from beam number 1 to beam number 16 before the obstacle 54 intervenes, that is, before communication interruption, and the communication characteristic in the beam direction of the right-handed circularly-polarized wave, corresponding to beam number 1, was the most satisfactory (see the left side of the arrow shown in FIG. 10(B)).

In FIG. 10(B), since the terminal apparatus 60 can determine that the shape of the antenna of the other wireless communication apparatus 50 is a right-handed circularly-polarized wave antenna, the terminal apparatus 60 performs switching to the right-handed direction and the beam direction in which the most satisfactory communication characteristic was acquired during communications before the predetermined time from the present time and acquires the communication characteristic between the terminal apparatus 60 and the other wireless communication apparatus 50. In FIG. 10(B), the communication characteristic in each beam direction in which the right-handed circularly-polarized wave was used was not satisfactory (see the right side of the arrow shown in FIG. 10(B)).

Hence, the terminal apparatus 60 switches the rotation direction of the circularly-polarized wave to the left-handed direction and acquires the communication characteristic between the terminal apparatus and the other wireless communication apparatus 50 in each of all beam directions similarly. In FIG. 10(B), the communication characteristic in the beam direction corresponding to beam number 15 in which the left-handed circularly-polarized wave was used was the most satisfactory (see the right side of the arrow shown in FIG. 10(B)).

In other words, in FIG. 10(B), the communication characteristic was the most satisfactory in the case of the circularly-polarized wave (left-handed direction) and the beam direction (beam number 15), completely different from the circularly-polarized wave (right-handed direction) and the beam direction (beam number 1) in which the communication characteristic was the most satisfactory at step S1. Hence, the terminal apparatus 60 can detect that the obstacle 54 intervened, and scans the beam directions of the circularly-polarized waves having both the rotation directions.

FIG. 11 is a comparison table in which the conventional technology and the first embodiment are compared with respect to the number of times in which beam direction scanning is performed to acquire the communication characteristic after communication interruption. In FIG. 11, the number of the beam directions in which a circularly-polarized wave having one rotation direction is radiated is 16. The number of the beam directions is not limited to 4 shown in FIG. 4 or 16 shown in FIG. 11, but an arbitrary number may be used.

In this embodiment, in both cases, that is, in the case that the terminal apparatus 60 was moved during communication between the other wireless communication apparatus 50 having a linearly-polarized wave antenna and the terminal apparatus 60 having a circularly-polarized wave antenna and in the case that the communication was interrupted since the obstacle 54 intervened therebetween, the number of times in which beam direction scanning is performed in the terminal apparatus 60 is 16, being reduced to a half in comparison with the number, 32, in the conventional technology.

This is because, in the combination in which the terminal apparatus 60 uses a circularly-polarized wave and the other wireless communication apparatus 50 uses a linearly-polarized wave antenna, there is no difference in communication characteristic depending on the rotation direction of the circularly-polarized wave of the terminal apparatus 60, whereby the scanning of beam directions may merely be performed in either the left or right handed direction.

Furthermore, in the case that the communication between the other wireless communication apparatus 50 having a circularly-polarized wave antenna and the terminal apparatus 60 having a circularly-polarized wave antenna was interrupted since the obstacle 54 intervened therebetween, the number of times in which beam direction scanning is performed in the terminal apparatus 60 is 32, unchanged from the number in the conventional technology; however, in the case that the terminal apparatus 60 was moved, the number of times in which beam direction scanning is performed in the terminal apparatus 60 is 16, being reduced to a Half in comparison with the number, 32, in the conventional technology. As described above, in correspondence with the reduction in the number of times in which beam direction scanning is performed in the terminal apparatus 60, the power consumption in the terminal apparatus 60 is reduced.

Although the operation of the terminal apparatus 60 has been mainly described in the flow chart shown in FIG. 6, operation in which the other wireless communication apparatus 50 acquires S/N in each beam direction may be performed before step S1, after step S1 or after step S2.

For example, after step S1 of FIG. 6, the other wireless communication apparatus 50 performs the operation of step S1 that was performed by the terminal apparatus 60 for the other wireless communication apparatus 50.

Hence, both the terminal apparatus 60 and the other wireless communication apparatus 50 can know their optimal beam directions.

Consequently, the terminal apparatus 60 according to this embodiment determines the shape of the antenna of the other wireless communication apparatus 50 serving as a communication partner and acquires the communication characteristic between the terminal apparatus and the other wireless communication apparatus 50 by switching the polarized wave and the beam direction in consideration of the polarized wave radiated by the antenna of the other wireless communication apparatus 50, periodically or in the case of communication interruption.

Consequently, in the communication between the terminal apparatus 60 and the other wireless communication apparatus 50, the terminal apparatus 60 can continue communication by performing switching to the polarized wave and the beam direction in which the most satisfactory communication characteristic was acquired. Furthermore, even in the case that the terminal apparatus 60 was moved or the obstacle 54 intervened, the terminal apparatus 60 can easily the operation required for the switching of the polarized wave and the beam direction; hence, in the case that the shape of the antenna of the other wireless communication apparatus 50 is not a circularly-polarized wave antenna, the power consumption in the terminal apparatus 60 can be reduced.

Second Embodiment

In the first embodiment, in the case of determining the shape of the antenna of the other wireless communication apparatus 50, the terminal apparatus 60 performs radiation using a left-handed circularly-polarized wave and a right-handed circularly-polarized wave and also performs radiation using a circularly-polarized wave in the communication with the other wireless communication apparatus 50.

In the second embodiment, in the case of determining the shape of the antenna of the other wireless communication apparatus 50, the terminal apparatus performs radiation using linearly-polarized waves (for example, a vertically-polarized wave and a horizontally-polarized wave), performs switching between a linearly-polarized wave and a circularly-polarized wave depending on the shape of the antenna of the other wireless communication apparatus 50, and performs radiation.

Since the terminal apparatus 60 according to this embodiment has the same configuration as that of the terminal apparatus 60 shown in FIG. 1, the same components as those of the terminal apparatus 60 according to the first embodiment are designated by the same reference numerals and their descriptions are omitted or simplified, and the differences therebetween are described.

In the case that the antenna detector 65 has determined that the shape of the antenna of the other wireless communication apparatus 50 is a linearly-polarized wave antenna, the antenna detector 65 determines whether the type of the linearly-polarized wave radiated by the linearly-polarized wave antenna is a horizontally-polarized wave or a vertically-polarized wave. The antenna detector 65 outputs the result of the determination of the type of the linearly-polarized wave to the communication controller 64 or the antenna switcher 66.

In the case that the antenna detector 65 has determined that the shape of the antenna of the other wireless communication apparatus 50 is a linearly-polarized wave antenna, since the terminal apparatus 60 uses a circularly-polarized wave, it is possible for the terminal apparatus 60 to omit the determination as to whether the other wireless communication apparatus 50 uses a horizontally-polarized wave or a vertically-polarized wave.

Figure 12:
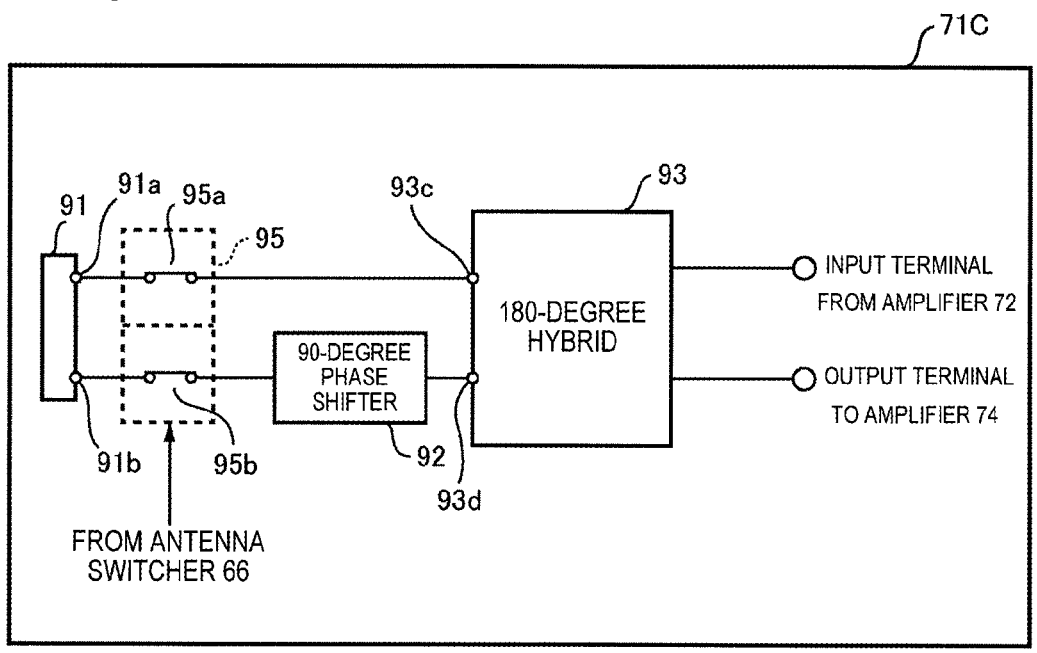
FIG. 12 is a view showing a circuit configuration of a polarized wave antenna in a second embodiment.

FIG. 12 is a view showing a circuit configuration of a polarized wave antenna 71C in the second embodiment. The polarized wave antenna 71C shown in FIG. 12 includes the two-terminal feeding-type circularly-polarized wave antenna 91, the 90-degree phase shifter 92, the 180-degree hybrid 93 and a switch 95.

In the first embodiment, according to the antenna switching control signal generated by the antenna switcher 66, the 90-degree phase shifter 92 switches the polarity of the phase difference of 90 degrees (for example, +90 degrees or −90 degrees), thereby switching the rotation direction of a circularly-polarized wave. In this embodiment, in the case that the switching of the rotation direction of a circularly-polarized wave is not necessary, that is, in the case that the terminal apparatus 60 radiates a circularly-polarized wave, either a left-handed circularly-polarized wave or a right-handed circularly-polarized wave may be used, whereby the 90-degree phase shifter 92 uses either one of polarities of the phase difference of 90 degrees (for example, +90 degrees).

The switch 95 includes a switch 95a and a switch 95b. The switch 95a is used to switch on or off the connection between the input/output terminal 91a of the two-terminal feeding-type circularly-polarized wave antenna 91 and the input/output terminal 93c of the 180-degree hybrid 93. The switch 95b is used to switch on or off the connection between the input/output terminal 91b of the two-terminal feeding-type circularly-polarized wave antenna 91 and the 90-degree phase shifter 92.

In the polarized wave antenna 71C shown in FIG. 12, the polarized wave radiated by the antenna unit 61 can be switched to a circularly-polarized wave or a linearly-polarized wave by rotating on or off the switches 95a and 95b.

More specifically, in the case that both the switches 95a and 95b are on, the polarized wave antenna 71C radiates a left-handed circularly-polarized wave or a right-handed circularly-polarized wave from the two-terminal feeding-type circularly-polarized wave antenna 91 as in the first embodiment.

In the combination in which the switch 95a is on and the switch 95b is off or in the combination in which the switch 95a is off and the switch 95b is on, the polarized wave antenna 71C radiates a linearly-polarized wave from the two-terminal feeding-type circularly-polarized wave antenna 91.

In the two-terminal feeding-type circularly-polarized wave antenna 91, power is fed to positions on the x-axis and the y-axis away from the center of the patch antenna by an equal distance. Hence, in the polarized wave antenna 71C, there is a deviation of 90 degrees in the directions of the polarized waves radiated from the input/output terminals 91a and 91b between the combination in which the switch 95a is on and the switch 95b is off and the combination in which the switch 95a is off and the switch 95b is on, whereby the polarized wave antenna 71C radiates the polarized wave as a vertically-polarized wave or a horizontally-polarized wave.

In the case that the switching between the linearly-polarized wave and the circularly-polarized wave is possible, the polarized wave antenna 71C may have a configuration different from that shown in FIG. 12 and may be configured using components other than the two-terminal feeding-type circularly-polarized wave antenna 91, the 90-degree phase shifter 92, the 180-degree hybrid 93 and the switch 95.

(Communication Operation Procedure of the Terminal Apparatus 60)

Figure 13:
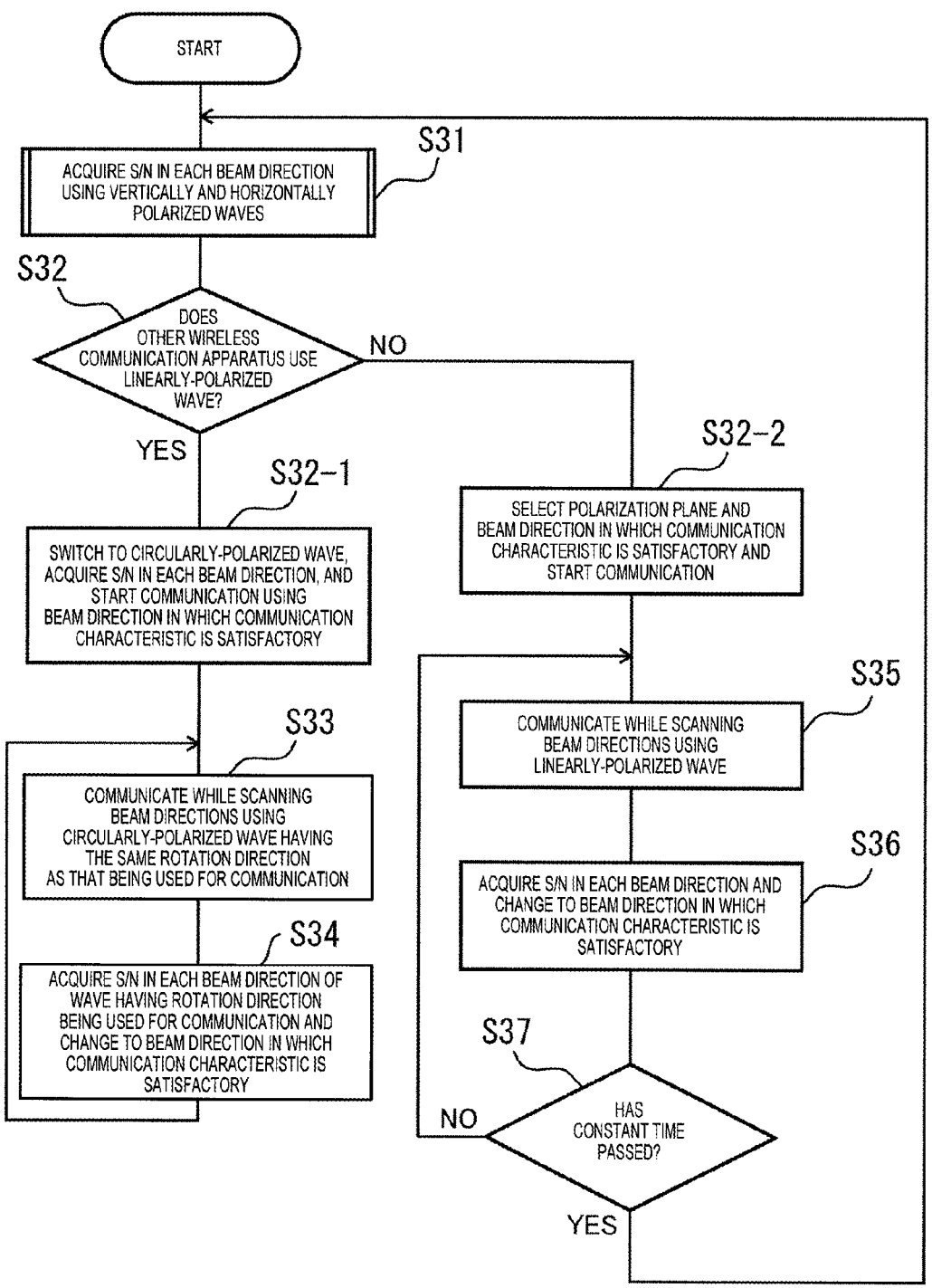
FIG. 13 is a flow chart describing the communication operation procedure in the terminal apparatus according to the second embodiment.

Next, the communication operation procedure in the terminal apparatus 60 according to this embodiment will be described referring to FIG. 13. FIG. 13 is a flow chart describing the communication operation procedure in the terminal apparatus 60 according to the second embodiment. The description in FIG. 13 is given assuming that the antenna unit 61 of the terminal apparatus 60 radiates the vertically-polarized wave and the horizontally-polarized wave of a linearly-polarized wave.

Figure 14:
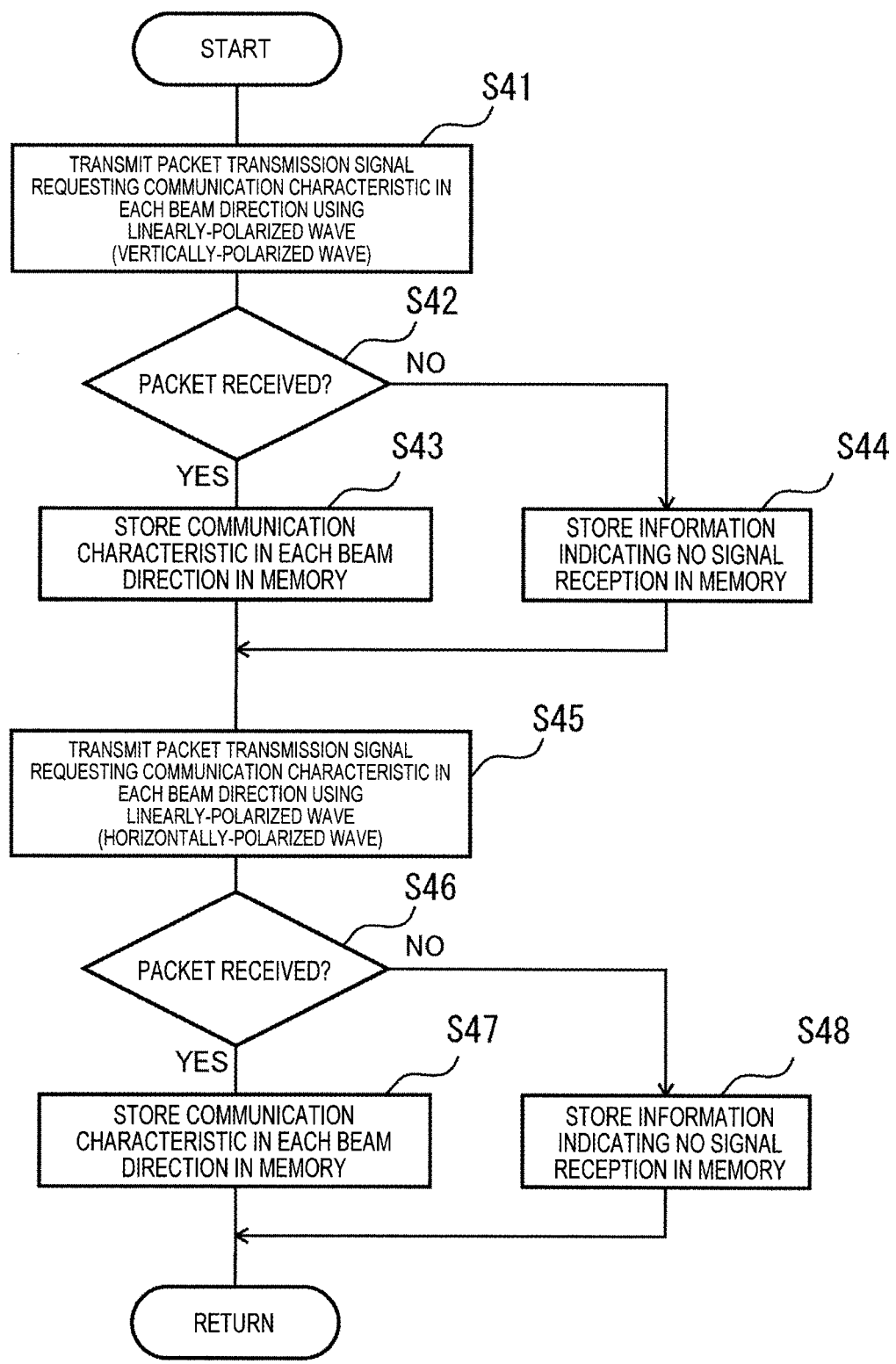
FIG. 14 is a flow chart describing the operation procedure for determining the shape of the antenna of the other wireless communication apparatus at step S31 shown in FIG. 13.

In FIG. 13, before the wireless communication between the terminal apparatus 60 and the other wireless communication apparatus 50 is started, the communication controller 64 determines the shape of the antenna of the other wireless communication apparatus 50, that is, the type of the polarized wave radiated by the antenna of the other wireless communication apparatus 50 (see FIG. 14). More specifically, the communication controller 64 causes the antenna switcher 66 to switch the polarization plane (vertically-polarized wave or horizontally-polarized wave) and the beam direction of the linearly-polarized wave radiated by the antenna unit 61, thereby acquiring the communication characteristic in each beam direction in the linearly-polarized waves having both the polarization planes (at S31).

(Operation Procedure for Determining the Shape of the Antenna of the Other Wireless Communication Apparatus 50)

FIG. 14 is a flow chart describing the operation procedure for determining the shape of the antenna of the other wireless communication apparatus 50 at step S31 shown in FIG. 13.

In FIG. 14, the communication controller 64 switches the linearly-polarized wave radiated by the antenna unit 61 to, for example, a vertically-polarized wave, outputs an instruction for switching the beam direction of the vertically-polarized wave to the antenna switcher 66, and further generates a communication characteristic acquisition request for requesting the communication characteristic between the terminal apparatus and the other wireless communication apparatus 50 and then outputs the request to the transmitter 62.

According to the instruction of the communication controller 64, the antenna switcher 66 switches the linearly-polarized wave radiated by the antenna unit 61 to a vertically-polarized wave, and generates an antenna switching control signal for switching the beam direction of the vertically-polarized wave and then outputs the signal to the antenna unit 61.

According to the communication characteristic acquisition request generated by the communication controller 64, the transmitter 62 generates, for example, a packet transmission signal for requesting the communication characteristic between the terminal apparatus and the other wireless communication apparatus 50, and outputs the signal to the antenna unit 61. According to the antenna switching control signal generated by the antenna switcher 66, the antenna unit 61 transmits the packet transmission signal generated by the transmitter 62 in each of all beam directions using the vertically-polarized wave (at S41).

Upon receiving the packet transmission signal transmitted using the vertically-polarized wave, the other wireless communication apparatus 50 returns a packet receiving signal including information indicating the communication characteristic in each beam direction to the terminal apparatus 60.

In the case that the packet receiving signal has been received from the other wireless communication apparatus 50 (YES at S42), the terminal apparatus 60 outputs the packet receiving signal to the receiver 63 via the antenna unit 61. The receiver 63 demodulates the packet receiving signal output by the antenna unit 61 and outputs the result of the demodulation of the packet receiving signal to the antenna detector 65.

On the basis of the result of the demodulation of the packet receiving signal of the receiver 63, the antenna detector 65 stores information indicating the communication characteristic between the terminal apparatus 60 and the other wireless communication apparatus 50 in each beam direction in memory (not shown) (at S43). In other words, the antenna detector 65 stores the information indicating the communication characteristic in each of all beam directions in the case that the vertically-polarized wave was used and instructs the communication controller 64 to perform the next operation, that is, to acquire the information indicating the communication characteristic in each of all the beam directions in the case that the horizontally-polarized wave was used.

On the other hand, in the case that no signal is returned from the other wireless communication apparatus 50 even after a constant time has passed after the terminal apparatus 60 transmitted the packet transmission signal in each beam direction (NO at S42), the antenna detector 65 stores information indicating that no signal is returned, that is, no signal is received, in each corresponding beam direction (at S44), and instructs the communication controller 64 to perform the next operation, that is, to acquire the information indicating the communication characteristic in each beam direction in the case that the horizontally-polarized wave was used.

Next, the communication controller 64 switches the linearly-polarized wave radiated by the antenna unit 61 to the horizontally-polarized wave, outputs an instruction for switching the beam direction of the horizontally-polarized wave to the antenna switcher 66, and further generates a communication characteristic acquisition request for requesting the communication characteristic between the terminal apparatus and the other wireless communication apparatus 50 and then outputs the request to the transmitter 62.

According to the instruction of the communication controller 64, the antenna switcher 66 switches the linearly-polarized wave radiated by the antenna unit 61 to the horizontally-polarized wave and generates an antenna switching control signal for switching the beam direction of the horizontally-polarized wave and then outputs the signal to the antenna unit 61.

According to the communication characteristic acquisition request generated by the communication controller 64, the transmitter 62 generates a packet transmission signal for requesting the communication characteristic between the terminal apparatus and the other wireless communication apparatus 50 and outputs the signal to the antenna unit 61. According to the antenna switching control signal generated by the antenna switcher 66, the antenna unit 61 transmits the packet transmission signal generated by the transmitter 62 in each of all beam directions using the horizontally-polarized wave (at S45).

Upon receiving the packet transmission signal transmitted using the horizontally-polarized wave, the other wireless communication apparatus 50 returns a packet receiving signal including information indicating the communication characteristic in each beam direction to the terminal apparatus 60.

In the case that the packet receiving signal has been received from the other wireless communication apparatus 50 (YES at S46), the terminal apparatus 60 outputs the packet receiving signal to the receiver 63 via the antenna unit 61. The receiver 63 demodulates the packet receiving signal output by the antenna unit 61 and outputs the result of the demodulation of the packet receiving signal to the antenna detector 65.

On the basis of the result of the demodulation of the packet receiving signal of the receiver 63, the antenna detector 65 stores information indicating the communication characteristic between the terminal apparatus and the other wireless communication apparatus 50 in each beam direction in memory (not shown) (at S47). In other words, the antenna detector 65 stores the information indicating the communication characteristic in each of all beam directions in the case that the horizontally-polarized wave was used. This completes the operation procedure for determining the shape of the antenna of the other wireless communication apparatus 50 shown in FIG. 14, and the communication operation procedure of the terminal apparatus 60 returns to step S32 of the flow chart shown in FIG. 13.

On the other hand, in the case that no signal is returned from the other wireless communication apparatus 50 even after a constant time has passed after the terminal apparatus 60 transmitted the packet transmission signal in each beam direction (NO at S46), the antenna detector 65 stores information indicating that no signal is returned, that is, no signal is received, in each corresponding beam direction (at S48). This completes the operation procedure for determining the shape of the antenna of the other wireless communication apparatus 50 shown in FIG. 14, and the communication operation procedure of the terminal apparatus 60 returns to step S32 of the flow chart shown in FIG. 13.

In FIG. 14, the terminal apparatus 60 first radiated the vertically-polarized wave and then radiated the horizontally-polarized wave; however, with respect to the sequence of the radiation of the linearly-polarized wave, either the vertically-polarized wave or the horizontally-polarized wave may be used first.

In FIG. 13, the antenna detector 65 compares the information indicating the communication characteristic in each beam direction in the case that the vertically-polarized wave was used with the information indicating the communication characteristic in each beam direction in the case that the horizontally-polarized wave was used (at S32).

On the basis of the result of the comparison between the information indicating the communication characteristic in each beam direction in the case that the vertically-polarized wave was used and the information indicating the communication characteristic in each beam direction in the case that the horizontally-polarized wave was used, the antenna detector 65 determines whether the shape of the antenna of the other wireless communication apparatus 50 is a circularly-polarized wave antenna or a linearly-polarized wave antenna (see FIG. 15).

FIG. 15 is a table showing the result of the comparison with respect to the polarized wave radiated by the antenna of the other wireless communication apparatus 50 in the case that the terminal apparatus 60 used linearly-polarized waves. FIG. 15 shows the result of the comparison with respect to the beam direction in which the most satisfactory communication characteristic was acquired in the case that the terminal apparatus 60 used the vertically-polarized wave and the horizontally-polarized wave of the linearly-polarized waves and that the other wireless communication apparatus 50 used the linearly-polarized wave and the circularly-polarized wave and that the beam direction was changed. The numerical value (for example, 2) shown in FIG. 15 represents the beam number of the beam direction in which the most satisfactory communication characteristic was acquired (see FIG. 4).

More specifically, in the case that the vertically-polarized wave and the horizontally-polarized wave were used and in the case that the difference in the communication characteristic between the terminal apparatus 60 and the other wireless communication apparatus 50 is within a predetermined range or the beam numbers of the beam directions in which the most satisfactory communication characteristic was acquired are the same (see the column 504 shown in FIG. 15), the antenna detector 65 determines that the shape of the antenna of the other wireless communication apparatus 50 is a circularly-polarized wave antenna.

This is because although power is reduced by half theoretically in the case that the horizontally-polarized wave was received by a circularly-polarized wave and the vertically-polarized wave was received by a circularly-polarized wave (see FIG. 5), both the horizontally-polarized wave and the vertically-polarized wave are received so as to have the same communication characteristic.

On the other hand, in the case that the vertically-polarized wave and the horizontally-polarized wave were used, the antenna detector 65 determines that the shape of the antenna of the other wireless communication apparatus 50 is a linearly-polarized wave antenna in the case that the difference in the communication characteristic between the terminal apparatus 60 and the other wireless communication apparatus 50 is not within a predetermined range, in the case that the beam numbers of the beam directions in which the most satisfactory communication characteristics were acquired are different (see the column 503 shown in FIG. 15) or in the case that no signal was returned in response to the radiation of the vertically-polarized wave or the horizontally-polarized wave.

This is because in the case that the polarization plane of the linearly-polarized wave of the terminal apparatus 60 is different from that of the other wireless communication apparatus 50, a large difference occurs in communication characteristic, resulting in poor communication (see FIG. 5).

In the case that the other wireless communication apparatus 50 returns, to the terminal apparatus 60, a packet receiving signal including the information on the beam direction in which the most satisfactory communication characteristic was acquired, when the beam direction in which the most satisfactory communication characteristic was acquired is the same regardless of which of the linearly-polarized wave antenna or the circularly-polarized wave is used by the other wireless communication apparatus 50, it is difficult, in some cases, for the terminal apparatus 60 to determine the shape of the antenna of the other wireless communication apparatus 50.

Hence, the terminal apparatus 60 measures reception power using RSSI (Received Signal Strength Indication); in the case that the reception power of the packet receiving signal transmitted using the linearly-polarized wave is different from the reception power of the packet receiving signal transmitted using the circularly-polarized wave, the terminal apparatus 60 determines that the shape of the antenna of the other wireless communication apparatus 50 is a linearly-polarized wave antenna.

In the case that the reception power of the packet receiving signal transmitted using the linearly-polarized wave is the same as the reception power of the packet receiving signal transmitted using the circularly-polarized wave, the terminal apparatus 60 determines that the shape of the antenna of the other wireless communication apparatus 50 is a circularly-polarized wave. Hence, the terminal apparatus 60 can easily determine the shape of the antenna of the other wireless communication apparatus 50.

After determining the shape of the antenna of the other wireless communication apparatus 50, the antenna detector 65 outputs the result of the determination to the communication controller 64. According to the result of the determination of the shape of the antenna of the other wireless communication apparatus 50, the communication controller 64 instructs the antenna switcher 66 to switch the polarized wave (circularly-polarized wave, linearly-polarized wave) and the beam direction, and starts communication between the terminal apparatus 60 and the other wireless communication apparatus 50.

(Communication Operation Procedure in the Case that the Other Wireless Communication Apparatus 50 has a Linearly-Polarized Wave Antenna)

In the case that the communication controller 64 determines that the shape of the antenna of the other wireless communication apparatus 50 is a linearly-polarized wave antenna (YES at S32) by the processing at step S31, the communication controller 64 switches the polarized wave radiated by the antenna unit 61 of the terminal apparatus 60 from the linearly-polarized wave to the circularly-polarized wave. Since the other wireless communication apparatus 50 has a linearly-polarized wave antenna, the rotation direction to be used may be either left or right.

Since the S/N in each beam direction is not changed even though the polarized wave of the antenna is switched, the direction obtained at step S1 may be used as the beam direction to be used; however, in the case of the circularly-polarized wave, the S/N is measured again in each beam direction in consideration of poor communication caused due to the reduction of the reception power to a half as shown in FIG. 5.

In other words, the terminal apparatus 60 switches the polarized wave radiated by the antenna unit 61 from the linearly-polarized wave to the circularly-polarized wave, acquires the communication characteristic between the terminal apparatus 60 and the other wireless communication apparatus 50 in each of all beam directions and starts communication with the other wireless communication apparatus 50 using the beam direction in which the most satisfactory communication characteristic was acquired (at S32-1). In the case that there is no beam that can be used for communication due to the switching to the circularly-polarized wave antenna, the terminal apparatus 60 starts communication using the horizontally-polarized wave or the vertically-polarized wave, whichever is more satisfactory in communication characteristic (at S32-1), in consideration of the result at step S31.

The operations at steps S33 and S34 serving as the communication operation procedure of the terminal apparatus 60 in the case that the terminal apparatus 60 was moved during communication between the terminal apparatus 60 and the other wireless communication apparatus 50 (see FIG. 4(B)) or in the case that the obstacle 54 intervened between the terminal apparatus 60 and the other wireless communication apparatus 50 during communication therebetween (see FIG. 4(C)) are the same as the operations at steps S3 and S4 shown in FIG. 6, the description thereof is omitted.

(Processing in the Case that the Other Wireless Communication Apparatus 50 has a Circularly-Polarized Wave Antenna)

Upon determining that the shape of the antenna of the other wireless communication apparatus 50 is a circularly-polarized wave antenna (NO at S32), the communication controller 64 starts communication using the horizontally-polarized wave or the vertically-polarized wave, whichever is more satisfactory in communication characteristic, in consideration of the result at step S31

For example, the communication controller switches the polarization plane of the linearly-polarized wave radiated by the antenna unit 61 to the horizontally-polarized wave, outputs an instruction for switching the beam direction of the horizontally-polarized wave to the antenna switcher 66, and starts communication (S32-2).

Next, the communication operation procedure of the terminal apparatus 60 in the case that the terminal apparatus 60 was moved during communication between the terminal apparatus 60 and the other wireless communication apparatus 50 (see FIG. 4(B)) or in the case that the obstacle 54 intervened (see FIG. 4(C)) during communication therebetween will be described.

The communication controller generates a communication characteristic acquisition request for requesting the communication characteristic between the terminal apparatus and the other wireless communication apparatus 50 and outputs the request to the transmitter 62.

According to the instruction of the communication controller 64, the antenna switcher 66 switches the polarization plane of the linearly-polarized wave radiated by the antenna unit 61 to the vertically-polarized wave, generates an antenna switching control signal for switching the beam direction of the vertically-polarized wave, and outputs the signal to the antenna unit 61.

According to the communication characteristic acquisition request generated by the communication controller 64, the transmitter 62 generates, for example, a packet transmission signal for requesting the communication characteristic between the terminal apparatus and the other wireless communication apparatus 50, and outputs the signal to the antenna unit 61. According to the antenna switching control signal generated by the antenna switcher 66, the antenna unit 61 transmits the packet transmission signal generated by the transmitter 62 using the vertically-polarized wave in each of all beam directions (at S35).

In the case that the terminal apparatus 60 was moved, the other wireless communication apparatus 50 receives the packet transmission signal transmitted by the terminal apparatus 60 through the communication paths 52a and 52b. Furthermore, in the case that the obstacle 54 intervened between the terminal apparatus 60 and the other wireless communication apparatus 50, the other wireless communication apparatus 50 receives the packet transmission signal transmitted by the terminal apparatus 60 through the communication path 51b.

Upon receiving the packet transmission signal transmitted using the vertically-polarized wave, the other wireless communication apparatus 50 returns a packet receiving signal including information indicating the communication characteristic in each beam direction to the terminal apparatus 60.

In the case that the terminal apparatus 60 was moved, the terminal apparatus 60 receives the packet transmission signal transmitted by the other wireless communication apparatus 50 through the communication paths 52a and 52b. Furthermore, in the case that the obstacle 54 intervened between the terminal apparatus 60 and the other wireless communication apparatus 50, the terminal apparatus 60 receives the packet receiving signal transmitted by the other wireless communication apparatus 50 through the communication path 51b.

The terminal apparatus 60 outputs the packet receiving signal received from the other wireless communication apparatus 50 to the receiver 63 via the antenna unit 61. The receiver 63 demodulates the packet receiving signal output by the antenna unit 61 and outputs the result of the demodulation of the packet receiving signal to the communication controller 64.

On the basis of the result of the demodulation of the packet receiving signal of the receiver 63, the communication controller 64 acquires information indicating the communication characteristic between the terminal apparatus and the other wireless communication apparatus 50 in each beam direction and stores the information in memory (not shown).

The communication controller 64 switches the beam direction of the vertically-polarized wave radiated by the antenna unit 61 to the beam direction in which the most satisfactory communication characteristic was acquired and continues communication between the terminal apparatus and the other wireless communication apparatus 50 (at S36).

The communication controller 64 judges using, for example, a timer, whether a constant time has passed after the beam direction of the vertically-polarized wave radiated by the antenna unit 61 was switched to the beam direction in which the most satisfactory communication characteristic was acquired (at S37). In the case that the constant time has not passed (NO at S37), the communication operation procedure of the terminal apparatus 60 returns to step S35.

On the other hand, in the case that the constant time has passed (YES at S37), the communication operation procedure of the terminal apparatus 60 returns to step S31.

The reason why the procedure herein returns to step S31 of the communication operation procedure, that is, the communication operation procedure for determining the shape of the antenna of the other wireless communication apparatus 50 in the case that the constant time has passed at step S37, is as described below.

Specifically, at the time when the communication operation procedure for determining the shape of the antenna of the other wireless communication apparatus 50 is carried out, the terminal apparatus 60 determines the shape of the antenna of the other wireless communication apparatus 50 as a circularly-polarized wave antenna in some cases, although the shape of the antenna of the other wireless communication apparatus 50 is a linearly-polarized wave antenna, depending on the respective positions of the terminal apparatus 60 and the other wireless communication apparatus 50.

For example, in the case that the terminal apparatus 60 and the other wireless communication apparatus 50 are not disposed at positions opposed to each other but they are disposed at positions deviated by 45 degrees with respect to the horizontal direction, the terminal apparatus 60 has a circularly-polarized wave antenna and receives the packet receiving signal whose reception power was reduced to a half, regardless of whether the vertically-polarized wave or the horizontally-polarized wave was radiated from the other wireless communication apparatus 50.

In the conventional technology, after the terminal apparatus 60 determines once that the shape of the antenna of the other wireless communication apparatus 50 is a circularly-polarized wave antenna, the terminal apparatus 60 does not determine the shape of the antenna of the other wireless communication apparatus 50 again, whereby it is difficult for the terminal apparatus 60 to carry out the communication operation procedure at step S33 and the following steps in which the linearly-polarized wave is used.

According to the above-mentioned description, the terminal apparatus 60 according to this embodiment can monitor the communication characteristic between the terminal apparatus and the other wireless communication apparatus 50 and can avoid packet loss. In the case that the terminal apparatus 60 has determined that the other wireless communication apparatus 50 has a circularly-polarized wave antenna, the terminal apparatus 60 performs radiation using a linearly-polarized wave, thereby being capable of acquiring the communication characteristic, regardless of the intervention of the obstacle 54 between the terminal apparatus 60 and the other wireless communication apparatus 50.

Consequently, the terminal apparatus 60 may merely transmit the packet transmission signal for requesting the communication determination using the linearly-polarized wave (for example, vertically-polarized wave or horizontally-polarized wave) having one polarization plane, whereby the power consumption required for the switching of the polarized wave and the beam direction can be reduced.

FIG. 16 is a comparison table in which the conventional technology and the second embodiment are compared with respect to the number of times in which beam direction scanning is performed to acquire the communication characteristic after communication interruption. In FIG. 16, the number of the beam directions in which a circularly-polarized wave having one rotation direction is radiated is 16.

In this embodiment, in both cases, that is, in the case that the terminal apparatus 60 was moved during communication between the other wireless communication apparatus 50 having a linearly-polarized wave antenna and the terminal apparatus 60 and in the case that the communication was interrupted since the obstacle 54 intervened therebetween, the number of times in which beam direction scanning is performed in the terminal apparatus 60 is 16, being reduced to a half in comparison with the number, 32, in the conventional technology.

Furthermore, in both cases, that is, in the case that the communication between the other wireless communication apparatus 50 having a circularly-polarized wave antenna and the terminal apparatus 60 was interrupted since the terminal apparatus 60 was moved and in the case that the communication therebetween was interrupted since the obstacle 54 intervened therebetween, the number of times in which beam direction scanning is performed in the terminal apparatus 60 is 16, being reduced to a half in comparison with the number, 32, in the conventional technology.

As described above, in correspondence with the reduction in the number of times in which beam direction scanning is performed in the terminal apparatus 60, the power consumption in the terminal apparatus 60 is reduced.

Consequently, the terminal apparatus 60 according to this embodiment determines the shape of the antenna of the other wireless communication apparatus 50 serving as a communication partner and acquires the communication characteristic between the terminal apparatus and the other wireless communication apparatus 50 by switching the polarized wave and the beam direction in consideration of the polarized wave radiated by the antenna of the other wireless communication apparatus 50, periodically or in the case of communication interruption.

Although various embodiments have been described above referring to the drawings, it is needless to say that the present disclosure is not limited to these examples. It is obvious that those skilled in the art can devise various alterations or modifications within the scope set forth in the claims, and it is understood that these belong to the technical scope of the present disclosure as a matter of course.

For example, although the case in which the two-terminal feeding-type circularly-polarized wave antenna has four elements has been described in the above-mentioned respective embodiments, the number of the elements is not limited to four. Furthermore, although the two-point feeding-type circularly-polarized wave patch antenna shown in FIG. 2 has been taken as an example of the circularly-polarized wave antenna, the circularly-polarized wave antenna is not limited to this type.

Furthermore, in the above-mentioned respective embodiments, the antenna unit 61 may allocate a left-handed or right-handed circularly-polarized wave antenna to each antenna element and may use a desired antenna element according to the antenna switching control signal generated by the antenna switcher 66.

Moreover, examples of the terminal apparatus 60 include a smart phone, a tablet terminal and a remote controller, serving as mobile apparatus being portable by the user. The terminal apparatus may be a stationary apparatus. Still further, examples of the other wireless communication apparatus 50 include a TV, a display apparatus and a PC (Personal Computer), serving as stationary apparatus. The wireless communication apparatus may be a mobile apparatus being portable by the user.

What's more, in the above-mentioned first embodiment, in the case that the terminal apparatus 60 acquires the communication characteristic between the terminal apparatus 60 and the other wireless communication apparatus 50 by using a right-handed circularly-polarized wave and by switching the beam direction thereof sequentially, provided that the number of the beam directions is, for example, 16, at the maximum (see FIG. 9), the communication characteristic acquisition request may be stopped at the time when the most satisfactory communication characteristic was acquired before the end of 16 times of beam direction scanning (switching), and the beam direction switching may be performed to the beam direction in which the most satisfactory communication characteristic was acquired, and then the communication may be continued.

As a result, in the terminal apparatus 60, the power consumption required for the beam direction scanning (switching) can be further reduced.

The present application is based on Japanese Patent Application (Application No. 2013-055563) filed on Mar. 18, 2013, the contents of which are hereby incorporated by reference.

INDUSTRIAL APPLICABILITY

The present disclosure is useful as an antenna switching device that acquires the communication characteristic between the apparatus and the other wireless communication apparatus serving as a communication partner and easily switches the polarized wave to be radiated by an antenna to the polarized wave corresponding to the satisfactory communication characteristic therebetween, periodically or in the case of communication interruption.

DESCRIPTION OF REFERENCE SIGNS

50 Other Wireless Communication Apparatus
60 Terminal Apparatus
61, 61A, 61B Antenna Unit
62 Transmitter
63 Receiver
64 Communication Controller
65 Antenna Detector
66 Antenna Switcher

The invention claimed is:

1. An antenna switching device performing wireless communication with another wireless communication apparatus, comprising:
an antenna unit which, in operation, switches a first polarized wave and a first beam direction in the wireless communication and which, in operation, radiates the first polarized wave to the other wireless communication apparatus in the first beam direction;

a communication controlling circuitry which, in operation, acquires a communication characteristic corresponding to a second polarized wave radiated from the other wireless communication apparatus and a second beam direction of the second polarized wave radiated from the other wireless communication apparatus;

an antenna detecting circuitry which, in operation, determines the second polarized wave used by an antenna of the other wireless communication apparatus based on the acquired communication characteristic; and an antenna switching circuitry which, in operation, switches the first polarized wave and the first beam direction in the wireless communication with the other wireless communication apparatus depending on the determined second polarized wave used by the antenna of the other wireless communication apparatus.

2. The antenna switching device according to claim 1, wherein the antenna unit radiates a left-handed or right-handed circularly-polarized wave, and wherein the antenna detecting circuitry determines that the second polarized wave radiated from the antenna of the other wireless communication apparatus is a linearly-polarized wave when a first communication characteristic acquired by the antenna using the one of left-handed circularly-polarized wave and the right-handed circularly-polarized wave is in a predetermined range, and determines that the second polarized wave radiated from the antenna of the other wireless communication apparatus is a circularly-polarized wave when the first communication characteristic is outside the predetermined range.

3. The antenna switching device according to claim 2, wherein after the second polarized wave radiated from the antenna of the other wireless communication apparatus is determined to be the linearly-polarized wave, and when the wireless communication has been interrupted, the antenna switching circuitry does not switch a rotation direction of the circularly-polarized wave radiated from the antenna unit.

4. The antenna switching device according to claim 2, wherein after the second polarized wave radiated from the antenna of the other wireless communication apparatus is determined to be the circularly-polarized wave, and when the wireless communication has been interrupted, the antenna switching circuitry switches a rotation direction of the circularly-polarized wave radiated from the antenna unit.

5. The antenna switching device according to claim 1, wherein the antenna unit radiates one of a horizontally-polarized wave having a horizontal polarization plane and a vertically-polarized wave having a vertical polarization plane, and wherein the antenna detector determines that the second polarized wave radiated from the antenna of the other wireless communication apparatus is a circularly-polarized wave when a second communication characteristic acquired by the antenna unit using one of the horizontally-polarized wave and the vertically-polarized wave is in a predetermined range, and determines that the second polarized wave radiated from the antenna of the other wireless communication apparatus is a linearly-polarized wave when the second communication characteristic is outside the predetermined range.

6. The antenna switching device according to claim 5, wherein when the second polarized wave radiated from the antenna of the other wireless communication apparatus is determined to be the linearly-polarized wave, the antenna switching circuitry switches the polarized wave radiated from the antenna unit from one of the horizontally-polarized wave and the vertically-polarized wave to the circularly-polarized wave.

7. The antenna switching device according to claim 5, wherein when the second polarized wave radiated from the antenna of the other wireless communication apparatus is determined to be the circularly-polarized wave, the antenna switching circuitry causes the antenna unit to radiate one of the horizontally-polarized wave and the vertically-polarized wave.

* * * * *